(12) United States Patent
Blitzer et al.

(10) Patent No.: US 7,840,595 B1
(45) Date of Patent: Nov. 23, 2010

(54) TECHNIQUES FOR DETERMINING AN IMPLEMENTED DATA PROTECTION POLICY

(75) Inventors: Aharon Blitzer, Shoham (IL); Aviram Katz, Kiryat Onno (IL); Roy Dahan, Ashdod (IL); Amit Lieberman, Raanana (IL); Maayan Maltz, Ein Hashofet (IL)

(73) Assignee: EMC Corporation, Hopkinton, MA (US)

( * ) Notice: Subject to any disclaimer, the term of this patent is extended or adjusted under 35 U.S.C. 154(b) by 411 days.

(21) Appl. No.: 12/214,667

(22) Filed: Jun. 20, 2008

(51) Int. Cl.
*G06F 7/00* (2006.01)
(52) U.S. Cl. .................. 707/781; 707/803; 726/1
(58) Field of Classification Search .............. None
See application file for complete search history.

(56) References Cited

U.S. PATENT DOCUMENTS

| | | | |
|---|---|---|---|
| 5,206,939 A | 4/1993 | Yanai et al. |
| 5,544,347 A | 8/1996 | Yanai et al. |
| 5,742,792 A | 4/1998 | Yanai et al. |
| 5,778,394 A | 7/1998 | Galtzur et al. |
| 5,845,147 A | 12/1998 | Vishlitzky |
| 5,857,208 A | 1/1999 | Ofek |
| 2006/0288183 A1 | 12/2006 | Boaz et al. |

*Primary Examiner*—Charles Rones
*Assistant Examiner*—Belix M Ortiz
(74) *Attorney, Agent, or Firm*—Muirhead and Saturnelli, LLC

(57) ABSTRACT

Described are techniques for determining an implemented data protection policy. One or more recovery points corresponding to each of one or more storage objects are determined. A data protection method determined in accordance with a facility and replication type associated with said each recovery point is selected for each of said one or more recovery points. A data protection category for each of said one or more recovery points is determined in accordance with said data protection method, a recovery point type, and a recovery point location associated with said each recovery point. A data protection policy indicating an implemented data protection policy for each of said one or more storage objects for at least one data protection category is stored.

15 Claims, 16 Drawing Sheets

| Category | RPO | RTO | Retention/Copies | Data Protection Method | RP Location | Frequency |
|---|---|---|---|---|---|---|
| Logical Corruption | 15 min | 60 min | 8 | Snap | Local | Hourly |
| Operational Recovery | 15 min | 60 min | 1 | Copy | Local | Every 4 hours |
| Disaster Recovery | 15 min | 4 hrs | 1 | Continuous | Remote | Continuous |
| Long Term Retention | 1 week | 24 hrs | 52 | Backup | Local or remote | Weekly |

FIG. 2

| Facility | RP Replication Type | DP Method |
|---|---|---|
| BCV | PIT | Copy |
| BCV | PIT-Consistent | Copy |
| Clone | PIT | Copy |
| Clone | PIT-Consistent | Copy |
| Snap | PIT | Snap |
| Snap | PIT-Consistent | Snap |
| RDF | Continuous | Remote-Continuous |
| RDF/PIT | PIT | Remote-Copy |
| RDF/PIT | PIT-Consistent | Remote-Copy |
| NetBackup | PIT | Backup |
| NetWorker | PIT | Backup |

FIG. 5

| DP method | RP Location | RP type | DP Category |
|---|---|---|---|
| Copy | Local | Restart | Operational Recovery |
| Copy | Local | Recover | Logical Corruption |
| Copy | Local | Restart | Operational Recovery |
| Copy | Local | Recover | Logical Corruption |
| Snap | Local | Restart | Logical Corruption |
| Snap | Local | Recover | Logical Corruption |
| Remote-Continuous | Remote | Restart | Disaster Recovery |
| Remote-Continuous | Local | Restart | Operational Recovery |
| Remote-Copy | Remote | Recover | Disaster Recovery |
| Remote-Copy | Remote | Restart | Disaster Recovery |
| Remote-Copy | Local | Recover | Operational Recovery |
| Backup | Local | Restart | Operational Recovery |
| Backup | Local | Recover | Long Term Retention |
| Backup | Remote | Restart | Long Term Retention |
| Backup | Remote | Recover | Long Term Retention |

TECHNIQUES FOR DETERMINING AN IMPLEMENTED DATA PROTECTION POLICY

BACKGROUND

1. Technical Field

This application generally relates to data storage, and more particularly to techniques used in connection with an implemented data protection policy.

2. Description of Related Art

Computer systems may include different resources used by one or more host processors. Resources and host processors in a system may be interconnected by one or more communication connections. These resources may include, for example, data storage devices such as those included in the data storage systems, such as the data storage arrays manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845, 147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

Different techniques may be used in connection with providing data protection. Data protection may be provided by a data protection process that makes a copy of an original set of data. The copy of data may be used upon the occurrence of an event causing data failure such as may occur, for example, when the original copy of data is destroyed, corrupted, or otherwise unavailable. Different strategies may be used to provide data protection for different types of failures that can occur. A data protection policy (DPP) may be designed to meet data protection criteria or objectives determined in a variety of different ways. Such criteria may be specified in a service level agreement (SLA), by management or administrators, and the like. Once designed, the DPP may then be implemented. It may be desirable to determine the actual configured or implemented DPP in an efficient manner for a variety of different reasons. One existing technique for determining the implemented DPP is a manual process which can be labor-intensive. Additionally, a computing environment may be modified in a variety of different ways that affects a currently implemented DPP. Thus, the foregoing manual process may be performed at a first point in time to determine the currently implemented DPP. Subsequent changes may be made to the computing environment causing changes to the implemented DPP thus causing the implemented DPP determined at the first point in time to now become outdated or obsolete.

SUMMARY OF THE INVENTION

In accordance with one aspect of the invention is a method for determining an implemented data protection policy comprising: determining one or more storage objects for which data protection processing is performed, said data protection processing including copying data for each of said one or more storage objects to one or more data protection storage devices; determining one or more recovery points corresponding to each of said one or more storage objects; selecting a data protection method for each of said one or more recovery points, wherein said data protection method selected is associated with said each recovery point and is determined in accordance with a facility and replication type associated with said each recovery point; selecting a data protection category for each of said one or more recovery points, wherein said data protection category selected is associated with said each recovery point and is determined in accordance with said data protection method, a recovery point type, and a recovery point location associated with said each recovery point; and storing a data protection policy indicating an implemented data protection policy for each of said one or more storage objects for at least one data protection category, said data protection policy for said each storage object for a first data protection category including a first data protection method and a first recovery point location associated with at least one of said one or more recovery points corresponding to said each storage object, wherein said first data protection category is determined by said selecting a data protection category and said first data protection method is determined by said selecting a data protection method. The data protection policy for said each storage object for said first data protection category may include an actual recovery point objective indicating an amount of data lost upon the occurrence of an incident in said first data protection category that causes data failure where the amount of data lost is measured in time. The data protection policy for said each storage object for said first data protection category may include an actual frequency indicating a rate at which a data protection process is performed for said first data protection category. For a first of said recovery points that corresponds to a first of said storage objects and is associated with a data protection category, the first recovery point may be created as a result of implementation of a data protection strategy for providing data protection for said first storage object upon an occurrence of an event included in said data protection category that causes a data loss. The recovery point type may be one of recoverable or restartable. A restartable recovery point may be a recovery point for which after a set of images comprising said recovery point is restored, no additional processing is needed prior to using data of said recovery point that has been restored. The restartable recovery point may be a recovery point that cannot be rolled forward in time to reflect a state of the data of the recovery point at a later time. A recoverable recovery point may be a recovery point for which, after a set of images comprising said recovery point is restored, additional processing is performed in order to use data of said recovery point that has been restored. The recoverable recovery point may be a recovery point that can be optionally rolled forward in time to reflect a state of data of the recovery point at a later time. The additional processing may reconstruct a working data set for use by an application. At least one of said storage objects may be a file system, data used by an application, a file, a directory, a physical device, a logical device, or a portion of a device. The method may also include receiving a query for a data protection policy for a selected one of said storage objects; and generating a view of said data protection policy. The step of selecting a data protection method may use a first set of mapping rules and said step of selecting a data protection category may use a second set of mapping rules.

In accordance with another aspect of the invention is a system for determining an implemented data protection policy comprising: a data protection method analyzer that determines a data protection method for a recovery point of a storage object based on a replication type and facility associated with said recovery point; a recovery point data strategy analyzer that determines a data protection category for said recovery point based on said data protection method, a recovery point type, and a recovery point location associated with said recovery point; a generator that generates a data protection policy indicating an implemented data protection policy for storage object for said data protection category, said generator calculating an actual recovery point objective and an actual frequency for said data protection category, said data protection policy for said storage object for said data protection category including said data protection method, said recovery point location, said actual frequency and said actual recovery point objective. The system may also include a view and report generator for creating a least one view or report of said data protection policy in accordance with a query. The generator may store said data protection policy in a data store, and said view and report generator may retrieve said data protection policy from said data store in connection with creating said at least one view or report. A plurality of different data protection categories may be associated with said storage object and a data protection policy generated by said generator for each of said different data protection categories. The data protection policy indicating an implemented data protection policy for storage object for said data protection category may include a number of retention copies indicating a number of recovery points.

In accordance with another aspect of the invention is a computer readable medium comprising executable code stored thereon for determining an implemented data protection policy, the computer readable medium comprising executable code for: determining one or more storage objects for which data protection processing is performed, said data protection processing including copying data for each of said one or more storage objects to one or more data protection storage devices; determining one or more recovery points corresponding to each of said one or more storage objects; selecting a data protection method for each of said one or more recovery points, wherein said data protection method selected is associated with said each recovery point and is determined in accordance with a facility and replication type associated with said each recovery point; selecting a data protection category for each of said one or more recovery points, wherein said data protection category selected is associated with said each recovery point and is determined in accordance with said data protection method, a recovery point type, and a recovery point location associated with said each recovery point; and storing a data protection policy indicating an implemented data protection policy for each of said one or more storage objects for at least one data protection category, said data protection policy for said each storage object for a first data protection category including a first data protection method and a first recovery point location associated with at least one of said one or more recovery points corresponding to said each storage object, wherein said first data protection category is determined by said selecting a data protection category and said first data protection method is determined by said selecting a data protection method. The data protection policy for said each storage object for said first data protection category may include an actual recovery point objective indicating an amount of data lost upon the occurrence of an incident in said first data protection category that causes data failure where the amount of data lost is measured in time, and an actual frequency indicating a rate at which a data protection process is performed for said first data protection category.

BRIEF DESCRIPTION OF THE DRAWINGS

Features and advantages of the present invention will become more apparent from the following detailed description of exemplary embodiments thereof taken in conjunction with the accompanying drawings in which:

FIG. 2 is an example illustrating in tabular form information that may be included in a DPP;

FIGS. 5 and 6 illustrate different mapping rules that may be used in an embodiment in performing the techniques herein;

DETAILED DESCRIPTION OF
EMBODIMENT(S)

Figure 1:
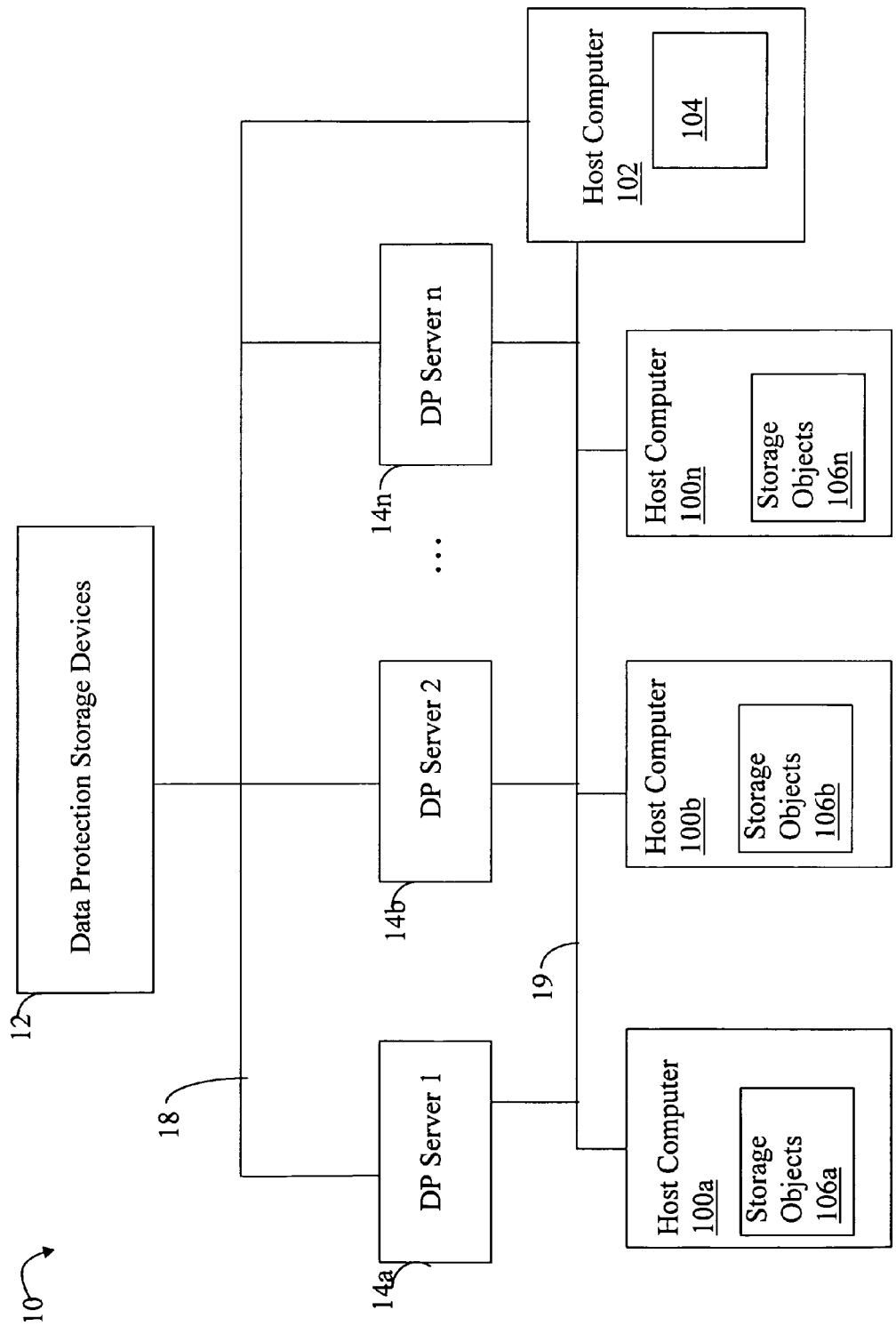
FIG. 1 is an example of an embodiment of a computer system that may utilize the techniques described herein.

Referring to FIG. 1, shown is an example of an embodiment of a system 10 that may be used in connection with performing the techniques described herein. Shown in the example system 10 are data protection (DP) servers 14a-14n, data protection (DP) storage devices 12, host computers 100a-100n, and 102, and communication mediums 18 and 19. The system 10 includes DP storage devices 12 connected to DP servers 14a-14n through communication medium 18. The hosts 100a-100n and 102 may communicate with DP servers 14a-14n through communication medium 19. The host 102 may also communicate with the DP servers 14a-14n over communication mediums 18 and/or 19. The communication mediums 18 and 19 may be any one or more of a variety of networks or other type of communication connections as known to those skilled in the art. Each of the communication mediums 18 and 19 may be a network connection, bus, and/or or other type of data link, such as a hardwire or other connections known in the art. For example, the communication mediums 18 and/or 19 may be the Internet, an intranet, network or other wireless or other hardwired connection(s) which facilitate communications between the different components.

The example 10 of FIG. 1 illustrates one type of computing and communications environment in which data may be copied from the host computers 100a-100n to one or more DP storage devices 12 as part of performing a data protection process as described in more detail below. Each of the components in the example 10 may be connected to the illustrated communication mediums by any one of a variety of connections as may be provided and supported in accordance with the type of communication medium in an embodiment. The processors included in the host computers 100a-100n and 102 may be any one of a variety of proprietary or commercially available single or multi-processor system, such as an Intel-based processor, or other type of commercially available processor able to support traffic in accordance with each particular embodiment and application. Although not shown, each of 100a-100n and 102 may also include other elements included in a computer system such as, for example, an input device, output device, one or more storage devices including computer readable storage mediums, and the like. The computer readable medium may include, for example, forms of memory such as RAM, disk storage, flash memory devices, and the like. In one embodiment, code for performing the techniques herein may be stored on a computer readable medium. The code may be executed by a processor in connection with performing techniques herein.

It should be noted that the particular examples of the hardware and software that may be included in components of FIG. 1 are described herein in more detail, and may vary with each particular embodiment. Each of the components of FIG. 1 may all be located at the same physical site, or, alternatively, may also be located in different physical locations. Some or all of the connections by which the components of FIG. 1 may be connected to the communication mediums 18, 19 may pass through other communication devices, such as a Connectrix or other switching equipment that may exist such as a phone line, a repeater, a multiplexer or even a satellite.

Each of the DP servers 14a-14n may represent a set of software modules which performs one or more data protection processes to copy data of storage objects 106a-106n to one or more DP storage devices 12. Data protection processes are described in more detail in following paragraphs. Each of 14a-14n may perform data protection processing independent of the others. The DP servers may be installed and execute on one or more dedicated computer systems or other computing devices. Depending on the particular data protection process performed, the software modules, or a portion thereof, of a DP server may also be co-located with other software and/or hardware. For example, as described elsewhere herein, one type data protection provided may be continuous data protection (CDP) using RDF (Remote Data Facility) by EMC Corporation of Hopkinton, Mass. A portion of the hardware and/or software used in connection with providing RDF functionality may be included in a data storage system. CDP is generally described in more detail below.

Element 12 may represent one or more DP storage devices of one or more different types of devices. For example, DP storage devices may include tapes, disks, flash memory, remote network storage devices such as may accessible through a storage network, and the like. In one embodiment, element 12 may represent more than one data storage system or data storage array located locally or remotely with respect to each other and other components of FIG. 1.

Each of the computers 100a-100n may include, respectively, one or more storage objects 106a-106n. A storage object may be defined as an entity in the network for which data protection may be provided. Examples of a storage object include a file, a directory, a virtual or logical storage device, a computer, an application, configured logical partition of a physical or virtual device, and the like. It should be noted that although storage objects are shown as being stored on computers 100a-100n, a storage object may also be stored on another component included in, or which has connectivity to, the network and system of FIG. 1. Data protection may be provided by performing a data protection process using any one or more different data protection methods. The data protection process provides copies of data, or portions thereof, by copying data from an original source, such as data of a storage object from one of the computers 100a-100n, to the DP storage devices 12. Different data protection methods in which the original data may be copied may use different technologies in providing the data protection. For example, an embodiment using the techniques herein may use data protection methods including one or more methods for providing different types of data backups (e.g., a full backup, incremental backup, differential backup, replication backup, such as through mirroring or point in time copy of data, tape-based backup, disk-based backup, RAID (redundant array of independent disks), snapshots, continuous data protection schemes, and other methods used to more generally provide a copy of data for storage in DP storage devices 12. Continuous data protection (CDP) refers to a DP method of providing a copy of an original data set by automatically saving a copy of every change made to that data capturing every version of the data that the user saves. CDP allows the user or administrator to restore data to any point in time.

Different facilities or products may be used in providing one or more data protection methods. As mentioned above, each data protection method may utilize a different underlying technology to provide data protection. Furthermore, an embodiment may use one or more facilities or products which each use a same DP method. For example, there may be 3 different software applications used to produce backup sets by performing a backup operation copying data to the DP storage. Each of the 3 software applications represent a different facility or means using the backup technology to obtain a copy of the original data in the DP storage. As another example, a version of RDF may be a facility providing continuous data protection. In an embodiment in which data storage systems are remote or local with respect to one another, the data storage systems may communicate with one another using RDF. The RDF functionality may be facilitated with a remote adapter which is an RDF adapter provided within communicating data storage systems. Communication between Symmetrix™ data storage systems using RDF is described, for example, in U.S. Pat. Nos. 5,742,792 and 5,544,347, both of which are incorporated by reference herein. Examples of different data protection methods and facilities that may be included in an embodiment using the techniques herein are described in more detail in following paragraphs and also known in the art.

The computer 102 may include one or more modules 104 including executable code for performing a variety of different tasks. The modules of 104 may perform processing as described in U.S. Patent Publication 2006/0288183 A1, U.S. patent application Ser. No. 11/403,745, filed on Apr. 12, 2006 (the '745 application), APPARATUS AND METHOD FOR INFORMATION RECOVERY QUALITY ASSESSMENT IN A COMPUTER SYSTEM, Boaz et al., which is incorporated by reference herein, for performing a recovery quality assessment. The modules of 104 may also perform processing for determining a currently implemented or configured DPP (data protection policy) using the techniques described herein. A DPP is described in more detail below. In connection with performing the assessment described in the '745 application, various types of information are collected and analyzed. An embodiment performing the techniques herein may use some of the information produced as a result of collecting and/or analyzing as described in the '745 application in determining the currently implemented or configured data protection policy as described herein. The '745 application describes obtaining information through collection and/or analysis. Such information may include, for example, when and/or how frequently data protection processing is performed, identifying data elements of the storage objects which are to be copied, source location (e.g., on the hosts 100a-100n) and target locations (e.g., location in the DP storage devices 12) for the data being protected, and the like. In addition to information described in the '745 patent application, other information used in connection with the techniques herein, such as facilities used to provide data protection, particular attributes about recovery points and images of the copies of the protected data, and the like, may also be stored on the host computer 102, obtained from the DP servers and/or host computers, determined through further analysis, or otherwise obtained from another location, other data store or repository, other software modules, and the like, for use in connection with the techniques herein. Thus, in one embodiment, element 104 may collectively represent the software modules necessary to implement the IRQA (Information Recovery Quality Assessment) Apparatus as described in the '745 application, or portions thereof, and also the techniques herein for determining the implemented DPP. As another exemplary embodiment, an embodiment performing the techniques herein to determine a currently implemented DPP may obtain information directly from the DP servers, host computers, and/or other components rather than from the IRQA Apparatus as described in the '745 application. It should be noted that although element 104 is illustrated as being included in single computer system, the modules comprising 104, or portions thereof, may be included on one or more computer systems or other devices. Such computer systems or devices may also include other software and perform other processing than as described herein and in the '745 application.

A data protection policy (DPP) may define how data is protected upon the occurrence of different types of events or incidents that cause a data failure such as, for example, where the data is corrupted, destroyed or otherwise unavailable. Incidents may include, for example, local incidents such as building fires, regional incidents such as earthquakes, and human mistakes, such as deleting a set of data. Such events or incidents may be partitioned into 4 categories or groups—logical corruption, operational recovery, disaster recovery, and long term retention. It should be noted that an embodiment may include a different set of categories than as described herein. Operational recovery may refer to incidents causing a data failure due to failure of one or more physical components that may be located at a site. An example of an incident associated with operational recovery is a hard drive failure. Logical corruption may be characterized as a localized or site specific data corruption or failure that occurs due to a human mistake such as deleting a data set. Disaster recovery may be characterized as a site failure such as upon the occurrence of fire, earthquake, and the like, where data at an entire site or location may be destroyed. Long term retention may be characterized as events requiring recovery of data from a relatively long period of time, such as more than a day. As an example, a virus may corrupt a data set on a first day and the corruption may not be discovered until the next time the data set is used which may be, for example, a week. Upon discovery of the corrupted data set, it may be necessary to recover a previous version of the data set prior to corruption from a DP storage location used for long term retention. Each of the foregoing 4 categories may be referred to herein as a data failure category or DP category indicating a grouping of incidents for which data protection is provided. An embodiment may partition incidents in a manner differently than as described herein.

For each of the foregoing categories, a data protection strategy as specified in a DPP may be determined indicating how data protection is provided upon the occurrence of an event in that category. A DPP may be designed to meet data protection criteria or objectives determined in a variety of different ways such as may be specified in a service level agreement (SLA), by management or administrators, and the like. Such objectives or criteria may include a recovery point objective (RPO) and recovery time objective (RTO) and may be specified for each of the foregoing 4 categories. For each category of possible failures, an organization may specify a DPP including required RTO and RPO in order to avoid unacceptable consequences associated with a break in continuity of availability and usage. The Recovery Point Objectives (RPO) in conjunction with the Recovery Time Objective (RTO) may be used in designing a DPP. RPO may be defined as the amount of data lost upon the occurrence of an incident causing data failure where the amount of data lost is measured in time. RTO may be defined as the duration of time within which a business process should be restored after a data failure in order to avoid unacceptable consequences associated with a break in continuity regarding availability of the affected data. In one embodiment, an RPO and RTO may be specified for each of the foregoing four categories in connection with defining or designing a DPP. Once a DPP is designed, the DPP may be implemented to meet the specified RTOs and/or RPOs for the categories.

Referring to FIG. 2, shown is an example illustrating one way in which a DPP may be defined. Once the policy is defined, it may then be implemented. In connection with the techniques herein, an implemented DPP may also be referred to as a configured DPP. Data storage administrators, management, and/or others may define an instance of a DPP in the form of 100 of FIG. 2. The DPP may then be implemented by configuring the computing environment as illustrated in FIG. 1. Subsequently, the techniques herein described in following paragraphs may then be used to collect and analyze information about the implemented DPP and then provide the user with such information. The techniques herein may be used to determine an implemented DPP in an automated fashion and then expose or make visible the currently implemented DPP to a user, such as through a user interface. A user may want to know the currently implemented DPP, for example, for purposes of verifying that the implemented DPP meets criteria as may be included in an SLA. More generally, the user may want to verify that the implemented DPP meets the previously provided definition. Such verification may also be performed to demonstrate that an implemented DPP is in compliance with a regulation or other type of requirement. It may also be necessary to determine a currently implemented DPP when adding new devices, migrating data from an existing to a new device, and the like. As illustrated in connection with other figures and description herein, an embodiment may use the techniques herein to determine an implemented DPP as illustrated in FIG. 2 without the RTO. Thus, FIG. 2 also illustrates information of a currently implemented DPP that may be determined via data collection and analysis in accordance with an embodiment performing the techniques herein. An instance of the information in the table 100 may be defined and also implemented for each storage object. For example, if 5 file systems are to be protect, 5 different DPPs may be designed and implemented.

Referring to FIG. 2, shown is an example of a DPP as may be defined and also implemented in which different DP strategies are included for each of the four categories of possible incidents causing data failure. The table in the example 100 includes a first row 120a indicating the type of information included in each of columns 122, 124, 126, 108, 110, 112 and 114. Each of rows 120b-120e indicate information associated with one of the possible categories of data failures. The information in each of rows 120b-120e is an expression of the data protection strategy to provide data protection upon the occurrence of an incident causing data failure. Column 122 specifies the four data failure categories or DP categories described above. Column 124 specifies the RPOs. Column 126 specifies the RTOs. Column 108 specifies the number of copies or recovery points (RPs) included in the DP devices for a particular storage object. Column 108 indicates a number of data copies maintained so that when a new copy is created as a result of performing a DP process, an oldest retained copy may be replaced. An RP for a storage object may be characterized as a set of images that should all be restored in order to recover data for the storage object. Column 110 specifies the DP method used to provide data protection. Column 112 specifies the relative location of where the copies or RPs are stored. In this example, the RP location is indicated as local or remote with respect to where the original copy of the data is stored. Local indicates that the copy of the data, such as an RP, is located physically at the same site as the original data set. Remote indicates that the copy of the data is located at a physically remote location or site different from the location of the original data set. Frequencies are indicated in column 114. Values in column 114 indicate the frequency at which the data protection process is performed. As an example in which the table 100 of FIG. 2 represents a currently implemented DPP for a storage object, row 120b of table 100 indicates that the DP strategy used to provide data protection upon the occurrence of a logical corruption is performed using the DP method of snapshot taken hourly which stores the copy of the data locally. Currently, there are 8 RPs or copies retained and the RPO is 15 minutes and the RTO is 60 minutes.

In the example 100, DP methods illustrated are snap, copy, continuous and backup. Snap indicates that a snapshot of an original data set is made. In connection with a snapshot, changes are recorded with respect to a data set at a particular point in time. Using one snapshot technique often referred to as "copy on write", the data set may serve as a read-only base copy against which subsequent modifications are recorded, such as using a write log. When performing the data protection operation using the snapshot technique, the subsequent changes as included in the foregoing write log may be stored on a DP device, target location, while the base copy remains at the source location. In order to perform recovery, the base copy at the source location is needed as well as the copy of the write log from the target location on a DP device. Continuous indicates that continuous data protection (CDP) is provided as described elsewhere herein. Backup indicates that a copy of the data is provided using a backup technology such as by using full backups, incremental backups, and the like. Copy may generally refer to other techniques used to provide a replicate copy of a data set. The foregoing DP methods, as well as others that may be used in an embodiment in accordance with the techniques herein, are known in the art.

As an example of an RP, consider data used by an application that resides on C and E data drives. Each of the C and E drives has a different source location in one of the hosts and a different target drive in the DP storage devices 12. Images of both drives are needed for recovery for the application data and thus data from both drives is included in an RP for the application data. The DP method used performs a DP process to replicate both C and E drives to 2 other disks included in the DP storage devices 12. In order to perform a recovery operation for the application data, the copy of data for both the C and E drives need to be restored. Other data may need to be restored as also used by the application. For example, database or other logs as used by the application may also need to be saved to DP storage by the DP method for subsequent retrieval in connection with performing a recovery operation. As a result, when copying data to DP storage of element 12 for a data protection process, the log information may be subsequently copied in addition to other application data. Similarly, when performing a restoration operation, this log information is needed and included in the set of images for the RP. Each vendor, application, and the like, may have different data requirements and thus different data may be copied to the DP devices and also included in an RP for use when performing a restoration operation.

Different attributes may be associated with an RP. An RP may be recoverable, restartable, or both. A restartable RP may be characterized as an RP for which after the set of images is restored, no additional processing is needed to begin using the data such as with an application. Also, there is no option to roll-forward in connection with the restored data. In other words, the restored images of a restartable RP represent a set of data at a point in time and cannot be rolled forward or made to reflect the state of the data at any other subsequent point in time. Thus, two characteristics of a restartable RP are that no additional processing of the data is needed once RP data is restored in order to begin using the data, and there is no option to roll the restored data forward. A recoverable RP may be characterized as an RP where additional steps or subsequent actions are needed after restoring the RP from the DP storage in order for the restored data to be ready for use. The restored data may be optionally rolled forward to a later point in time. The subsequent actions may include, for example, performing processing needed to reconstruct a working data set for the application.

As an example of an RP that is restartable, consider an RP including data for an application. The RP includes a first set of data representing data at a first point in time. In connection with performing the data restoration to recover data to the first point in time, the first data set is restored and ready for use. No actions need to be performed to the first data set prior to use by the application. Thus, the RP may be restartable provided that the RP meets the restartable criteria described elsewhere herein in more detail.

As an example of an RP that is recoverable, the RP may include a first set of data representing data at a first point in time. Changes made with respect to this first set of data up to a second point in time may be stored in the form of logged write transactions. In connection with performing the data restoration to recover data from the second point in time, the first data set is restored along with the transaction log recording changes made from the first point in time to the second point in time with respect to the first set of data. In connection with restoring the application data to the second point in time, additional steps are performed prior to the data set being ready for use by the application. The additional steps may include applying logged write transactions up to the second point in time. Additionally, the first data set may also be rolled forward to a later date by applying additional logged write transactions. Thus, the RP in this example may be recoverable with respect to the RP at the second point in time provided that the RP meets the recoverable criteria described elsewhere herein in more detail.

Figure 10:
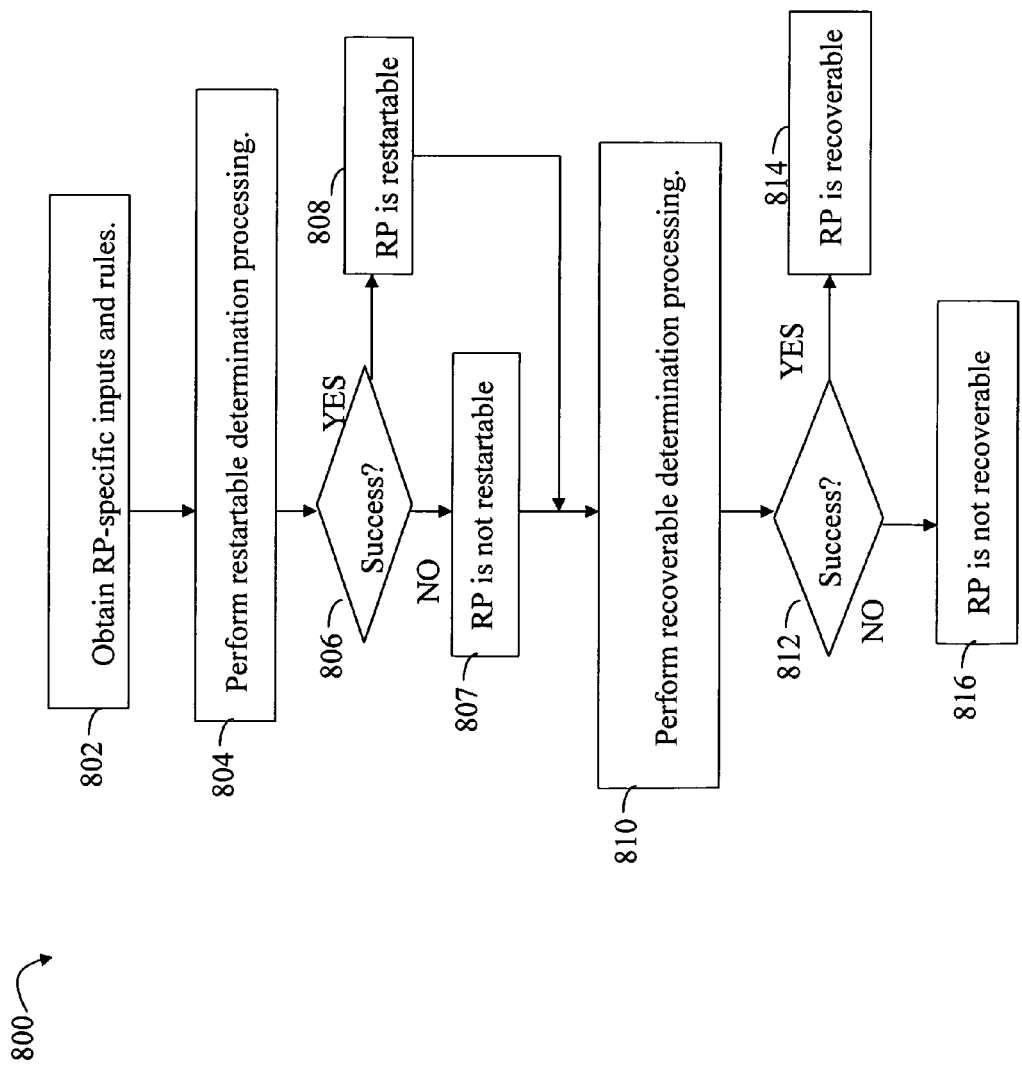
FIGS. 10-13 are flowcharts of processing steps that may be performed in an embodiment to determine whether a recovery point is restartable and/or recoverable.

Additionally, a single RP that meets both the recoverable criteria and the restartable criteria described elsewhere herein in more detail, for example, in connection with FIG. 10, is characterized as both recoverable and restartable.

As will be described in more detail in following paragraphs, an embodiment using the techniques herein may collect information, such as from the IRQA Apparatus, and perform analysis to determine whether an RP is restartable and/or recoverable.

Another attribute that may be associated with an RP indicates an RP replication type. In one embodiment, possible replication types may be PIT (point in time), PIT-consistent, or continuous. An RP having a replication type of "PIT" indicates that the RP provides a point in time copy which may be defined as a fully usable copy of a defined collection of data that contains an image of the data as it appeared at a single point in time. The copy is considered to have logically occurred at that point in time although different DP methods may use different techniques in providing the copy (e.g., via database log replay or rollback).

An RP having a replication type of "PIT consistent" may be defined as a PIT copy which is consistent with respect to writes or modifications made up to a point in time as applied across the entire RP. Thus, an RP which is PIT consistent is an instance of an RP which has dependent write consistency. As an example, consider an application which writes to three different files when a user performs an update or write transaction. Thus, from the user or application perspective, the user write transaction may be characterized as an atomic operation with respect to the three files in that for there to be dependent write consistency for the application data set (e.g., the three files used by the application), writes to each of the three files need to be completed so that the 3 files are synchronized with respect to the processing needed to complete the user write transaction. If, for example, the application should fail to complete the updates necessary to one of the files, the application data set may be deemed not to be dependent write consistent. In an embodiment including the foregoing application, a sequence number or generation number may be written in each of the three files when updates to that file for a single user write transaction are complete. Thus, a determination as to whether the application data set is dependent write consistent may be made by examining the sequence or generation number of each of the three files. If all 3 files have the same sequence number, then the application data set is dependent write consistent, and otherwise, the data set is not dependent write consistent. As will be appreciated by those skilled in the art, the foregoing is only one example of a dependent write consistent data set and how this may be determined in connection with the techniques herein. In connection with the previous exemplary application data set, a PIT consistent RP reflects a state in which all files and other data elements of the application data set are aligned or synchronized with respect to the same application write transaction. Thus, all portions of the RP reflect having applied the updates with respect to a same application write transaction.

An RP may also have a replication type of "continuous" in which the RP is produced as a result of a continuous data protection process or continuous DP method, such as RDF where updates are propagated to the DP storage on a continuous or ongoing basis as the updates are made to the original copy.

What will now be described are processing steps that may be performed in an embodiment to determine a currently implemented DPP.

Figure 3:
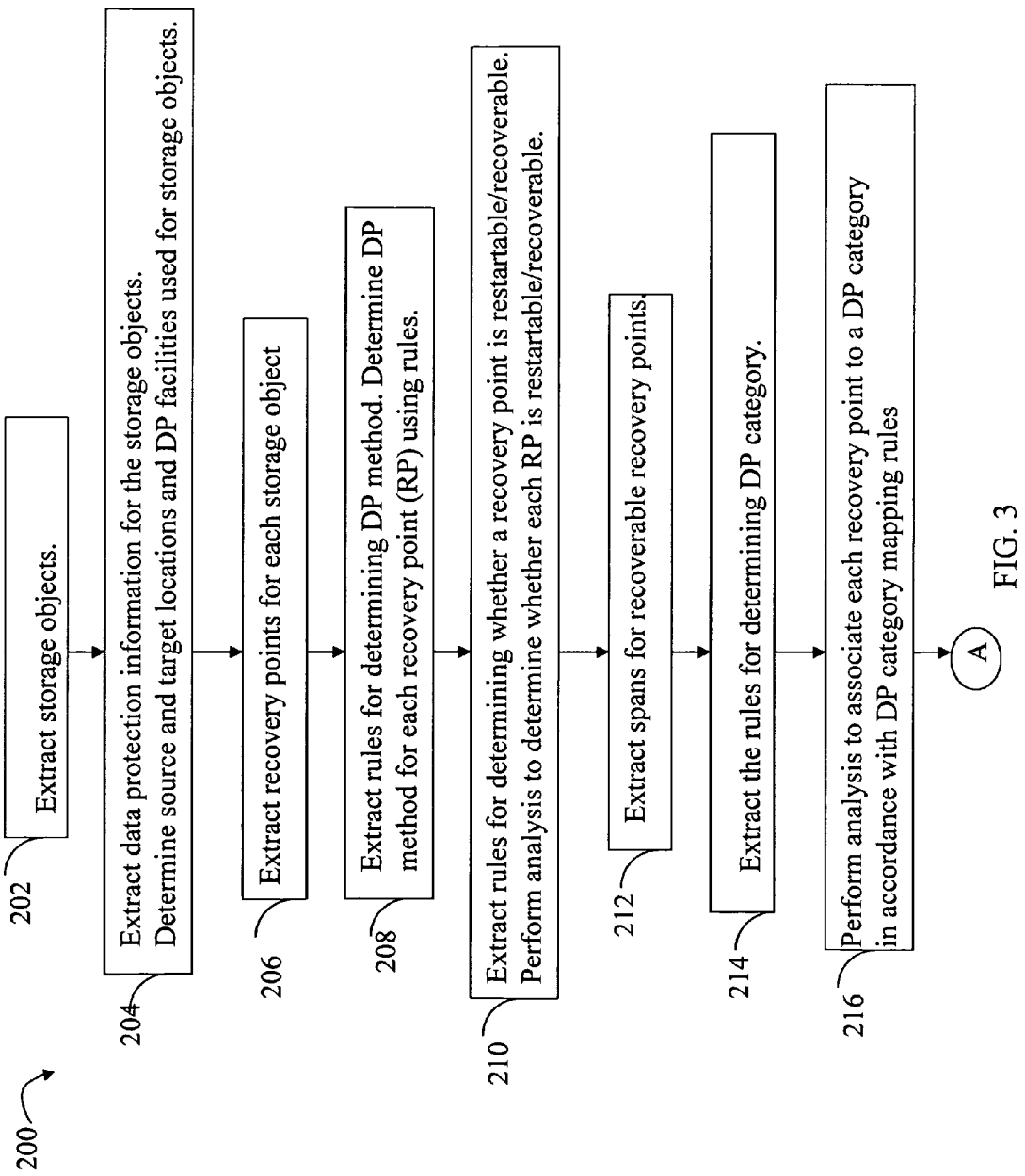
FIGS. 3-4 are flowcharts of processing steps that may be performed in an embodiment to determine an implemented DPP in accordance with the techniques herein.
Figure 4:
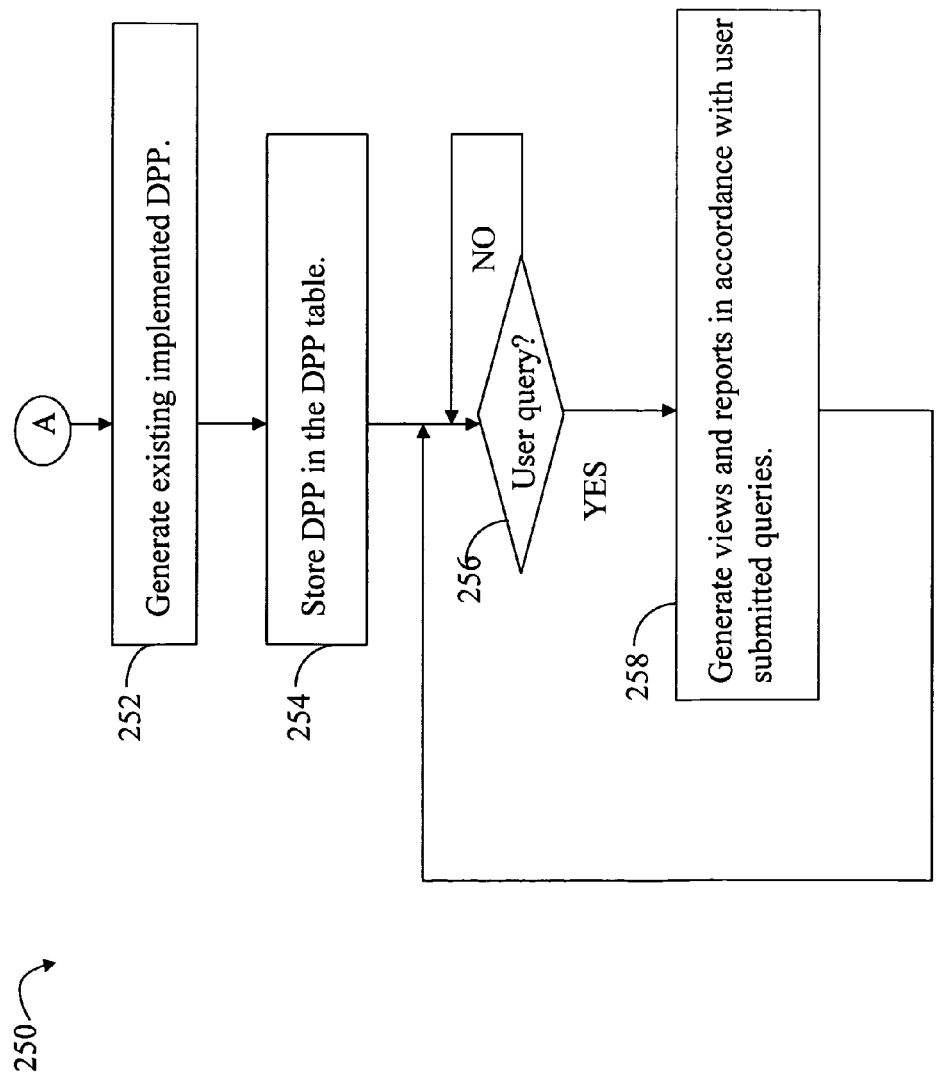

Referring to FIGS. 3 and 4, shown are flowcharts of processing steps that may be performed in an embodiment in connection with determining a currently implemented DPP using the techniques herein. At step 202, the storage objects for which a DPP may be defined are extracted. The storage objects may be determined by communicating with the IRQA Apparatus as described in the '745 application, the DP servers and/or host computers, or other location. At step 204, DP information for the storage objects determined in step 202 is extracted. DP information extracted may generally include information used in subsequent processing steps such as, for example, the source and target locations of files or data elements of each storage object, the DP facilities and DP methods used to provide DP for the storage objects, information used to provide a correlation or pairing of storage objects and copies of the files or data elements on the DP devices (e.g., target location) associated with each storage object, target copy specific information such as when the copy on the DP device was created, the date(s) for which the copy provides data protection, and the like. Information in step 204 may be obtained in a variety of different ways as described in connection with step 202. At step 206, the RPs for each storage object are extracted. Step 206 may include determining which of the copies of the original data stored on the DP devices (e.g. which copies of files, images, and/or other data elements in the DP devices comprise the different RPs. Step 206 may also include associating the different RPs with the appropriate storage objects. The RPs that exist for each storage object may be obtained in a variety of different ways as described in connection with step 202. In one embodiment, the RPs associated with each storage object may be retrieved from the IRQA Apparatus. As described in the '745 application, the IRQA Apparatus may output a set of RPs as may be associated with a storage object such as an application. Using this information and other data, the images associated with each RP may be retrieved from the DP storage devices 12. The '745 application describes how to determine the set of RPs using information collected and may perform recovery logic analysis to validate the ability to recover with images of a particular RP. An embodiment performing the techniques herein may retrieve the set of RPs as determined by the IRQA Apparatus.

In step 208, the rules for determining a DP method associated with each RP may be extracted. In the embodiment described herein, the DP method of an RP may be determined in step 208 by performing analysis of collected information using the foregoing DP method mapping rules. As will be described in more detail elsewhere herein, the DP method may be determined using mapping rules based on, or as a function of, the RP replication type and the particular facility used to create the RP. More generally, determination of the DP method may be expressed as a function F1 where the DP method is determined as an output based on inputs or variables of facility and RP replication type. Thus, F1 may be expressed as:

$$F1(\text{facility}, \text{RP replication type}) = \text{DP method}$$

It should be noted that the RP replication type and facility used to create each RP may be obtained from information stored by the IRQA Apparatus, or other data store or repository accessible for use with the techniques herein. The DP method mapping rules of step 208 may be stored on the computer 102 of FIG. 1 with software performing the processing of FIG. 3, or other location accessible for use with the techniques herein.

In step 210, rules are extracted for determining whether each RP is restartable and/or recoverable. Step 210 then uses those rules to perform analysis and determines whether each RP is restartable and/or recoverable. As will be described in more in following paragraphs and figures, a determination as to whether an RP is restartable and/or recoverable may be made based on: the status of the storage object or application or other entity using the data of the storage object at the time of RP creation, the RP replication type, the storage object or application recovery logic, and a list of additional storage objects that should be protected and included in the RP. As an example regarding the additional storage objects, when performing an incremental backup, an incremental backup log file may be created which indicates the changes for the incremental backup operation with respect to a data set of the DP storage devices associated with a complete or prior full backup operation. Thus, the incremental backup log file generated as part of performing the DP process should also be included in this RP. The status of the storage object (or application or other entity using the data of the storage object) when the data protection processing is performed for creating the RP may be, for example, an indicator as to whether the application was offline or down during the data protection process, in a special mode as may be required when performing the data protection process, in a normal mode (such as when the application is utilizing the data being copied), and the like. The recovery logic may be obtained from the IRQA Apparatus. As described in the '745 application, the recovery logic may describe processing performed in connection with validating the ability to recover using the RP. Processing associated with the recovery logic may include determining whether the RP was created when the application or other entity using the storage object data was in a proper mode, determining whether all data elements of the original data set, such as all files of a file system that are being copied by DP processing, are protected by the RP (e.g., that there were no errors in connection with copying the files to the DP device during DP processing), and the like. As mentioned above the additional storage objects that should be included in the RP may also include another storage object, such as a data file generated as a result of performing the data protection processing. As described in connection with step 208, the rules used to determine whether each RP is restartable and/or recoverable may be stored on the computer 102 of FIG. 1 with software performing the processing of FIG. 3, or other location accessible for use with the techniques herein.

Step 212 is performed for those RPs which are determined in step 210 as being recoverable. Step 212 includes extracting the time spans for each RP based on the log(s) used to roll the RP forward. These logs are one type of log file described herein that may be created as a result of performing a DP process such as an incremental backup made with respect to a previous full data backup. As an example, this step may include identifying the log files used in connection with restoring a data set created by performing an incremental back up where the log file indicates the changes made with respect to a previous full backup copy. The time span may be the date/time range with respect to the data set representing the full backup copy and the log file as may be applied to the full backup copy. Identification of the log files associated with an RP may be determined by obtaining information from the IRQA apparatus, DP server, or other component as described more generally herein.

It should be noted that log files may be used in connection with creating both a recoverable RP at a first point in time and also in rolling the recoverable RP forward in time. A first set of log files may be used, for example, to create an instance of a recoverable RP at a first point in time. Once the recoverable RP is established, log files corresponding to points in time subsequent to the first point in time may optionally be included in an RP and used to roll the recoverable RP forward in time. The first set of log files used to create the recoverable RP at the first point in time may be characterized as required since without these files, there is no RP. This requirement, besides other criteria, are described in more detail in following paragraphs in connection with recoverable determination processing and associated criteria.

In step 214, the mapping rules for determining the DP category for each RP are extracted. The mapping rules of step 214 may be stored in any of a variety of locations as described above in connection with other rules used for other steps, such as steps 208 and 210. At step 216, the mapping rules for determining a data failure or DP category for the RP are used in connection with performing an analysis to associate each RP with a DP category. It should be noted that step 216 applies the mapping rules obtained in step 214 to associate one or more DP categories, for example, one of the 4 categories indicated by column 122 of FIG. 2, with each RP. Thus, the mapping rules for determining a DP category may also be characterized as DP strategy rules which identify a DP strategy, as implemented when creating the RP, for each of the possible categories of DP or data failures. In connection with step 214 and others herein using rules, only a portion of the rules stored in a data base or other data store or repository may be retrieved and/or utilized depending on which rules may be relevant. Application of the mapping rules used to determine the DP or data failure category for an RP may be more generally represented as a function F2 where the output in this particular embodiment is the DP category determined based on three inputs or variables—DP method, RP location, RP type, where DP method is the output of function F1 described above, RP location is as described in connection with column 112 of FIG. 2, and RP type is one of restartable or recoverable as also described elsewhere herein in more detail. Function F2 may be expressed as:

$F2(DP\ method, RP\ location, RP\ type) = $ data failure or DP category.

In step 252, the currently implemented DPP may be generated. As described herein in one embodiment, the implemented DPP may include a set of information as illustrated in FIG. 2 with omission of the RTO. In this example, the DPP does not include an RTO value but a DPP can include an RTO and/or other information than as illustrated in FIG. 2. Step 252 may include calculating the RPO and calculating the frequency for each DP category of each storage object. The RPO calculation may be determined as a time difference expressed as:

time difference=(current time−time associated with the latest/most recent RP)

where "time associated with the latest/most recent RP" represents the most recent recovery time provided by all the RPs for a storage object. Determination of RPO may use information for the RPs determined in connection with step 212. As described herein, the frequency represents the frequency at which the data protection process is performed for a given storage object. For example, the frequency may indicate how frequently a file system is backed up (e.g., rate at which an RP is generated as a result of performing a data protection process for RPs included in one DP category for a storage object). It will be appreciated that the frequency calculation representing the actual frequency (as opposed to a frequency determined based on planned or scheduled DP processing times which may not actually occur) can be determined in a variety of different ways. For example, the frequency for a storage object may be based on time information obtained from another type of DP process log files recording a session when the data process was performed, using date/time information stored elsewhere as to when the DP process was commenced, using attributes associated with the RP indicating creation date/time, and the like. The foregoing may indicate when each RP for a storage object is created. The frequency may also be obtained using information included in a DP process schedule indicating when a DP process for a storage object is scheduled. Such information used to calculate the frequency may be obtained, for example, from the IRQA Apparatus.

In step 254, the DPP may be stored in a DPP table or other form for use in connection with subsequent processing steps. It should be noted that processing of FIGS. 3 and 4 up to and including step 254 may be performed as a first stage at a first point in time. Subsequently, the information stored in step 254 may be used to generate views and reports in accordance with processing of steps 256 and 258. At step 256, a determination may be made as to whether a user query has been entered. If not, control waits at step 256 until step 256 evaluates to yes. At step 258, views and reports are generated in accordance with the user submitted queries. From step 258, processing may return to step 256. It should be noted that processing of steps 256 and 258 are illustrated as a continuous loop to represent the processing as may be performed in connection with obtaining and responding to user submitted queries such as in connection with an interactive user interface. Processing of steps 256-258 may terminate when the user interface is closed.

Described in following paragraphs are examples of different rules used in connection with FIGS. 3 and 4 processing steps, Referring to FIG. 5, shown is an example illustrating a representation of the DP method mapping rules as may be used in connection with step 208 as described above. The example 300 includes the rules in a tabular form in which each rule may correspond to a row of the table 300. Column 302 identifies the facility. Column 304 identifies the RP replication type. Column 306 identifies the DP method. Information in columns 302 and 304 are inputs used to determine the DP method of column 306 as an output for particular value pairs of facility and RP replication type. As indicated in the example 300, DP method mapping rules may exist for different facilities including BCVs (business continuance volumes), Clone (such as by EMC's TimeFinder/Clone), Snap (providing a snapshot), RDF, RDF/PIT, NetBackup, and Net-Worker. As different facilities are added or functionality associated with a facility changes, additional DP method mapping rules may added. In an embodiment in which a particular facility is not used, the rules related to that facility may not be retrieved for use with processing of FIG. 3 as described above. The facilities may be provided by one or more vendors. With reference to the example 300, Business Continuance Volumes (BCVs) and data operations used in connection therewith, are described in U.S. Pat. No. 6,101,497, filed on Apr. 25, 1997, which is herein incorporated by reference. RDF and RDF/PIT may refer to different types of data protection that can be provided using RDF functionality. Net-Backup, and NetWorker may refer to software applications by one or more vendors used to perform a backup. In the example 300, the RP replication type 304 and exemplary DP methods of 306 including Copy, Snap, Backup, and Continuous are described in more detail elsewhere herein. It should be noted in FIG. 5, the DP method for continuous may be indicated in 306*a* as "remote", and the DP method for Copy may be indicated in 306*b*, 306*c* as "remote". In the context of a DP method, a DP method designated as "remote" may refer to a DP method performed which results in creating a copy of an original data set in a different data storage system, such as a different data storage array, than the data storage system or array that includes the source or original copy. In other words when specifying "remote" for the DP method, the source or original data set is stored on a first data storage system (e.g., such as a first data storage array) and the copy or target created as a result of performing the DP method is stored on a second different data storage system (e.g., such as a second data storage array). The foregoing first and second data storage systems may be located at the same site or physical location. The "remote" aspect refers to the different data storage arrays for the source and target data sets which may be at the same physical site. A DP method in column 306 which is not designated as remote (e.g., as illustrated in every row of table 300 except for 306*a*, 306*b* and 306*c*) indicates that the foregoing first and second data storage systems are the same data storage system, such as the same data storage array.

As new facilities are added, additional rules DP method mapping rules may be created for use in an embodiment.

Referring to FIG. 6, shown is an example illustrating a representation of the DP category mapping rules as may be used in connection with steps 214 and 216 as described above. The example 400 includes the rules in a tabular form in which each rule may correspond to a row of the table 400. Column 402 indicates the DP method. Column 404 indicates the RP location. Column 406 indicates an RP type as one of recoverable or restartable. Column 408 indicates the DP category. Values that may be specified for elements of 402, 404, 406 and 408 are described elsewhere herein in more detail. Values for 402 may be as determined using the rules of FIG. 5. Values for 404 may be one of local or remote indicating the location of the RPs for the storage object. Values for 406 may be based on the determination of RP attributes of restartable and/or recoverable. Values for 408 may be one of the 4 data failure or DP categories. Information in columns 402, 404, and 406 are inputs that may be used in determining a DP category as indicated in column 408.

It should be noted that although a rules-based approach is described herein for determining the DP method and data failure or DP category, it will be appreciated by those skilled in the art that other non-rules-based approaches may be used to implement the techniques herein in an embodiment.

What will now be described is an example of software components that may be used in connection with performing the techniques herein such as performing the processing steps described in connection with the flowcharts of FIGS. 3 and 4.

Figure 7:
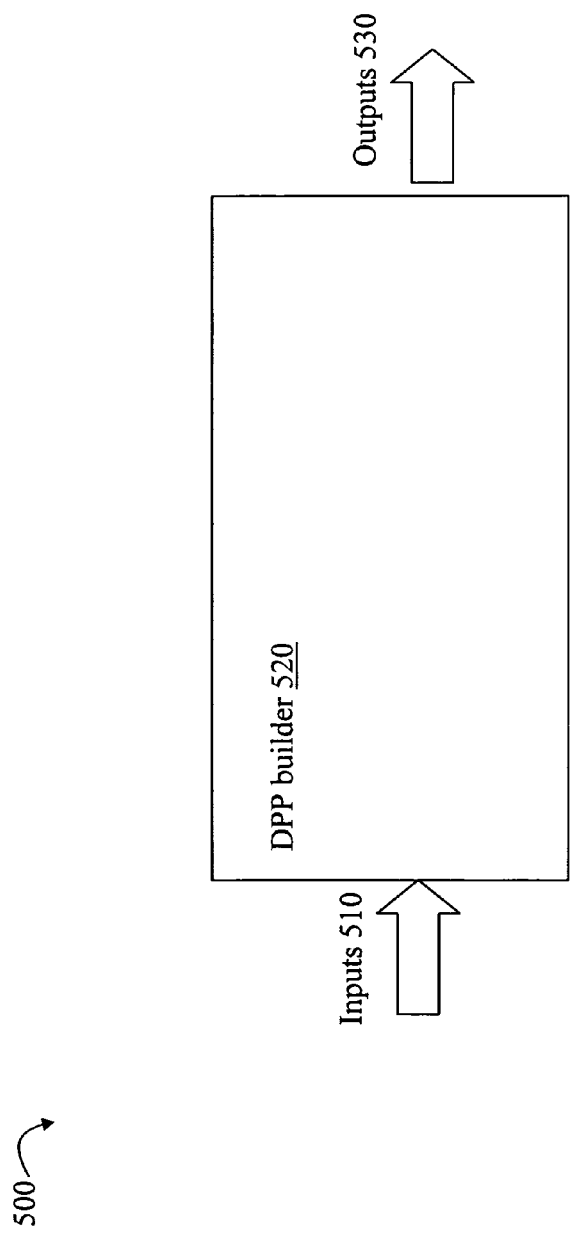
FIGS. 7-9, 14 and 15 are examples illustrating in more detail inputs and outputs that may be used in connection with different components in performing the techniques herein.

Referring to FIG. 7, shown is an example illustrating a representation of DPP builder. The DPP builder 520 may represent the module that performs the processing described herein for determining the currently implemented DPP. The DPP builder 520 takes a variety of different inputs 510 as described elsewhere herein and generates the DPP, as well as views and/or reports regarding the DPP, as outputs 530. As described elsewhere herein, the DPP generated at a first point in time as a first output may also be an input to the DPP builder 520 used to generate a second output at a second later point in time. For example, the currently implemented DPP may be used to generate different views and reports thereof in connection with user queries. As described herein, the inputs and/or outputs may be stored locally, obtained from the IRQA Apparatus, host computers, DP servers and the like. The inputs may include, for example, a list of storage objects, facilities used to create RPs, a list of the RPs and associated DP storage locations, and the like.

Figure 8:
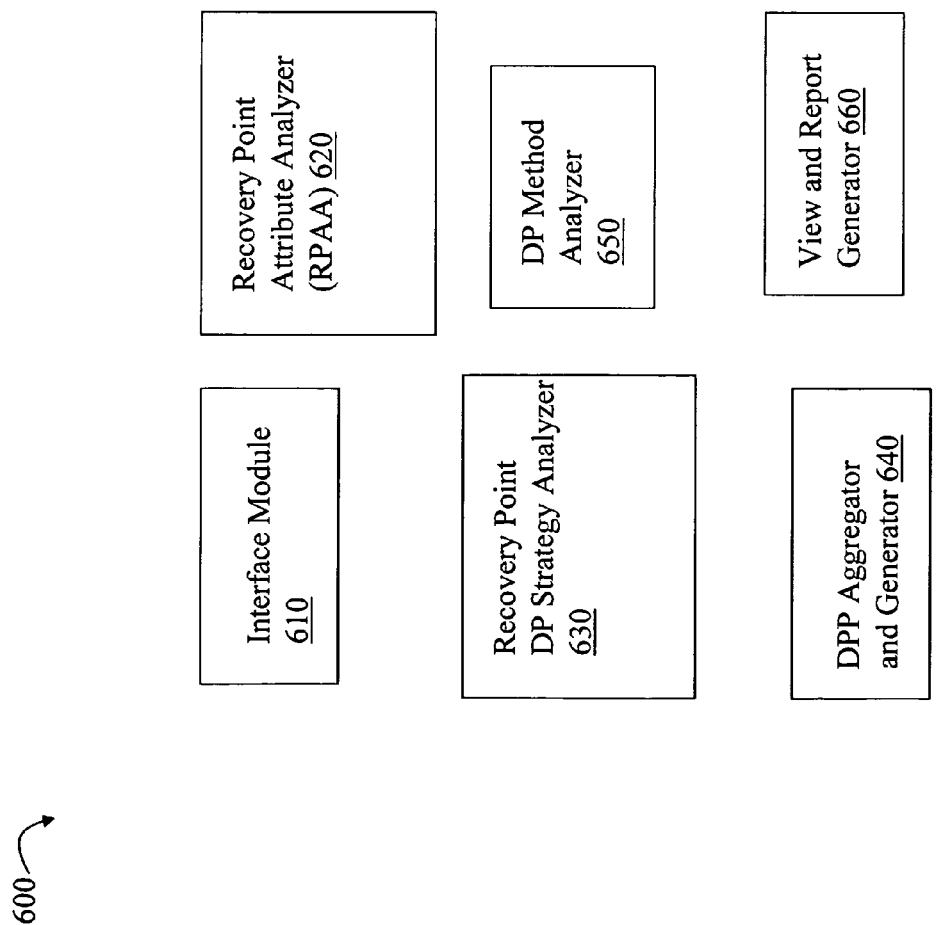

Referring to FIG. 8, shown is an example illustrating a logical representation of functional processing modules that may be included in an embodiment of the DPP builder of FIG. 7. The example 600 includes an interface module 610, a recovery point attribute analyzer (RPAA) 620, a recovery point DP strategy analyzer 630, a DP method analyzer 650, a DPP aggregator and generator 640, and a view and report generator 660. It should be noted that the elements of the example 600 may represent functional components that may correspond to different coded modules included in an embodiment of the DPP builder 520. Interface module 610 may perform processing to obtain information from the IRQA Apparatus or other locations used to determine the currently implemented DPP. The RPAA 620 may perform processing to determine whether an RP is recoverable and/or restartable. The RP DP strategy analyzer 630 may using the mapping rules of FIG. 6 to determine the DP category for each RP. The DP method analyzer 650 may used the mapping rules of FIG. 5 to determine the DP method. The DPP aggregator and generator 640 may aggregate the information received as inputs 510 and also generated as a result of processing performed by other components in connection with generating the DPP. Component 640 may also calculate the frequency and RPO for each DP category of a storage object. The view and report generator 660 may take as an input the DPP generated and stored by 640 at a first point in time, and then perform processing to generate views and reports of the DPP in accordance with user queries.

Figure 9:
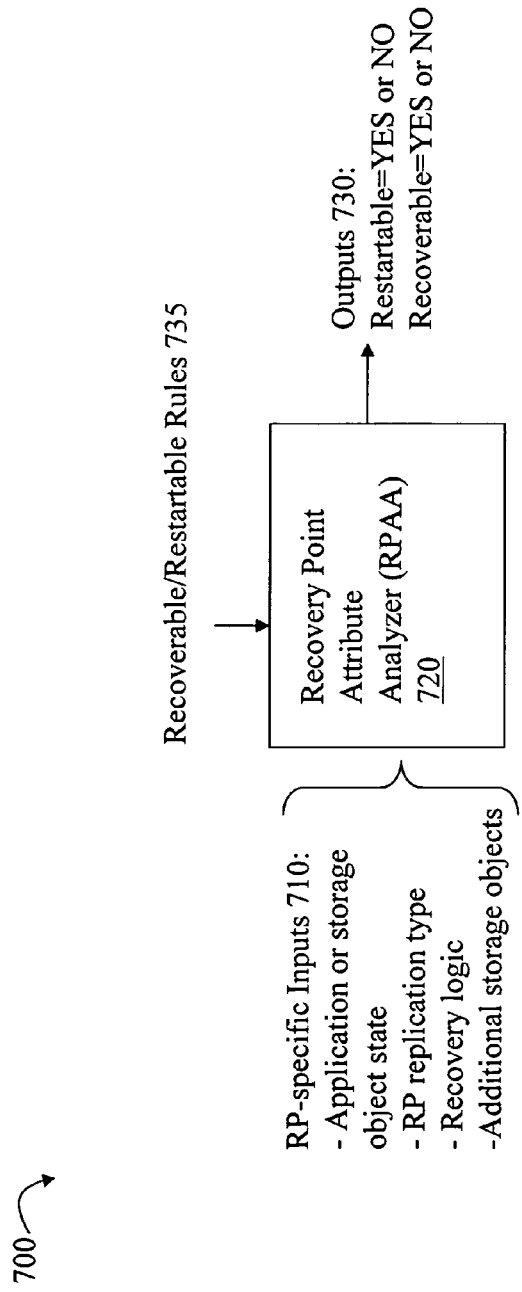

Referring to FIG. 9, shown is an example illustrating the inputs and outputs used by the RPAA in an embodiment performing the techniques herein. The RPAA 720 takes as inputs the recoverable/restartable rules 735 and RP-specific inputs 710 to determine, for each RP as indicated by output 730, a first indicator as to whether the RP is restartable and a second indicator as to whether the RP is recoverable. The rules 735 are described in more detail in following paragraphs and figures. The RP-specific inputs 710 may include the state of the application or storage object when the DP processing was performed to create the RP, the RP replication type, the recovery logic, and a list of additional storage objects. These are generally described above and elsewhere herein in more detail.

What will now be described are processing steps that may be performed by the RPAA to determine whether an RP is recoverable and/or restartable.

Referring to FIG. 10, shown is a flowchart of processing steps that may be performed by the RPAA. At step 802, the RP-specific inputs 710 and restartable/recovery determination rules 735 are obtained. At step 804, restartable determination processing is performed. Step 804 is described in more detail in following paragraphs. At step 806, a determination is made as to whether restartable determination processing of step 804 was successful. If so, control proceeds to step 808 where a determination is made that the RP is restartable and the appropriate indicator may be set as an output. Control then proceeds to step 810. If step 806 evaluates to no, control proceeds to step 807 where a determination is made that the RP is not restartable and the appropriate indicator may be set as an output. Control then proceeds to step 810. At step 810, recoverable determination processing is performed. At step 812, a determination is made as to whether recoverable determination processing of step 810 was successful. If so, control proceeds to step 814 where a determination is made that the RP is recoverable and the appropriate indicator may be set as an output. If step 812 evaluates to no, control proceeds to step 816 where a determination is made that the RP is not recoverable and the appropriate indicator may be set as an output.

Figure 11:
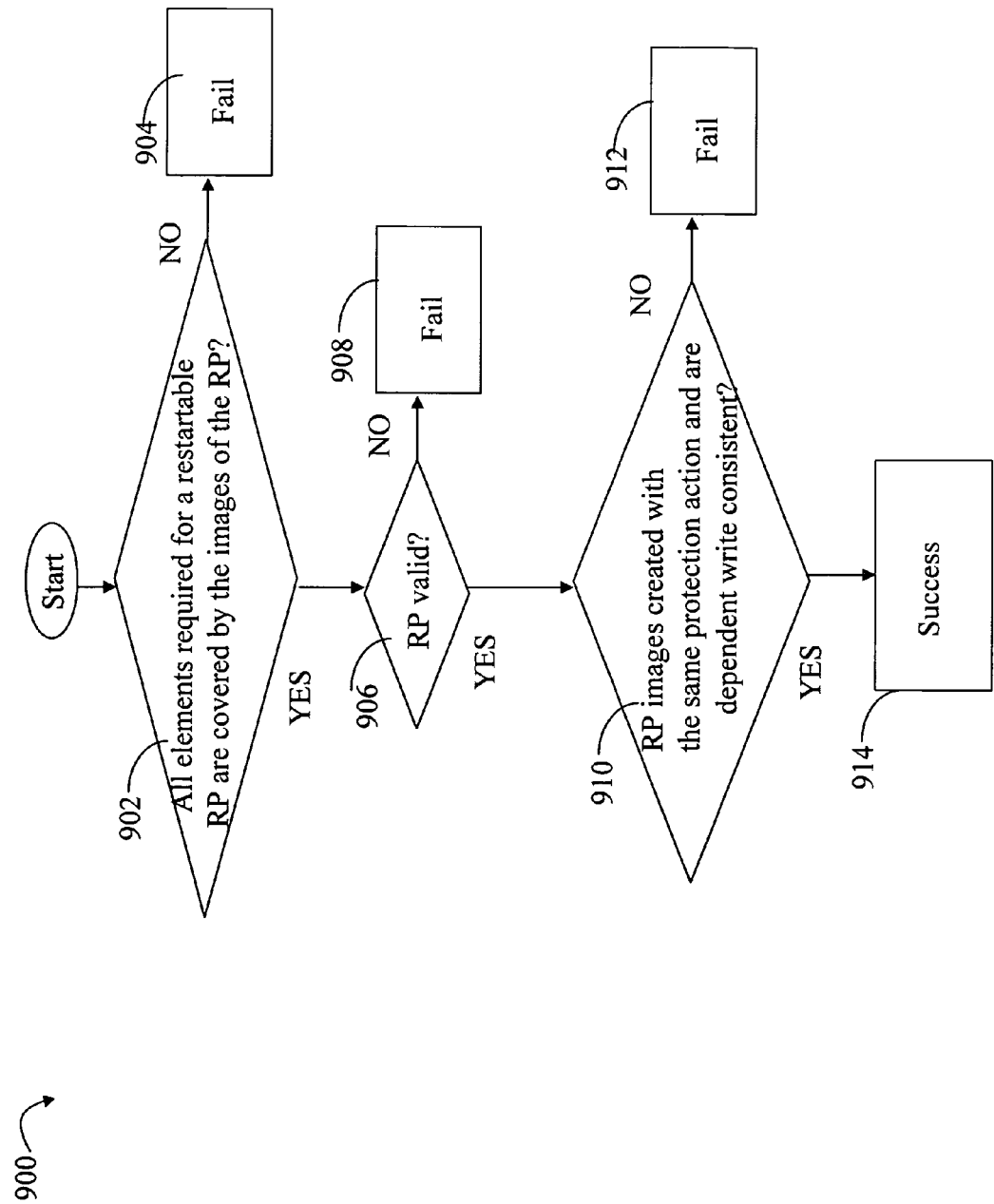

Referring to FIG. 11, shown is a flowchart for performing restartable determination processing. The flowchart 900 includes more detailed processing steps that may be performed in connection with step 804 of FIG. 10. The rules used in connection with performing restartable determination processing may indicate how to determine the following:

restartable rule 1: whether all files or data elements of an RP are dependent write consistent.

restartable rule 2: whether an RP has all required data (e.g., whether all required data is protected by the RP).

restartable rule 3: whether was created when the storage object, or application which utilizes the storage object data, is in a proper state.

It should be noted that each of the above restartable rules may actually be implemented using more than one rule although reference may be made herein to an embodiment in which each of the above restartable rules corresponds to a single rule. In one embodiment, the rules may indicate when each of the above conditions evaluates to true.

In connection with restartable rule 1, dependent write consistency is described elsewhere herein. As an example, an RP replication type of PIT-consistent indicates that the RP is dependent write consistent. It should be noted that dependent write consistency for an RP may also be obtained and determined in other ways than via the PIT consistent RP replication type Restartable rule 1 may indicate how to determine whether the RP is dependent write consistent.

Restartable rule 2 expresses how to determine that necessary data for performing a recovery operation are included in the images. For example, rule 2 may indicate that the RP should contain each file (or otherwise provide protection for each such file) in a file system where the file system is the storage object. Restartable rule 3 may indicate the allowable states that may be associated with the storage object, or application that uses the storage object data. For example, it may be that the application must be in a mode other than a normal processing mode when performing the DP processing. Restartable rule 3 may indicate that the foregoing application should offline or in a special back up mode when performing DP processing.

Referring still to FIG. 11, step 902 performs a determination as to whether all data elements are included in the RP or otherwise protected by the RP. If step 904 evaluates to no, control proceeds to step 904 where it is determined that restartable determination processing has failed. As described herein, a determination of success for restartable processing means that the RP is restartable, and a determination of failure means otherwise. If step 904 evaluates to yes, control proceeds to step 906 where a determination is made as to whether the RP is valid. If step 906 evaluates to no, control proceeds to step 908 where it is determined that restartable determination processing has failed. If step 908 evaluates to yes, control proceeds to step 910 where a determination is made as to whether the images of the RP were created with the same protection action and are dependent write consistent. In connection with step 908 and determining whether the images are created with the same protection action, an embodiment may examine information recorded during creation of the images of an RP to ensure that all such images were created as a result of performing the same DP process initiated at a same point in time. For example, step 908 determines whether a first image and a second image of an RP were created as a result of DP processing initiated at a same time and performed by the same facility. If step 910 evaluates to no, control proceeds to step 912 where it is determined that restartable determination processing has failed. Otherwise, if step 910 evaluates to yes, control proceeds to step 914 where it is determined that restartable determination processing has succeeded.

In connection with performing step 902, processing may be performed to check whether all required data elements are included in the RP. Step 906 may perform additional processing to assess the state of the RP data related to whether the RP can be used to perform recovery. For example, step 906 may check to ensure that no errors were generated at the time the DP processing created the RP. Such an error may indicate that data included in the RP may not be usable.

In connection with performing step 902, an embodiment may use restartable rule 2 to check, for example, whether all files of a file system are covered by the RP. Step 906 may use the recovery logic input and restartable rules 2 and 3. Steps 902 and 906 processing are described in the '745 application and may be performed by the IRQA Apparatus. Step 910 may use the RP replication type and restartable rule 1.

Figure 12:
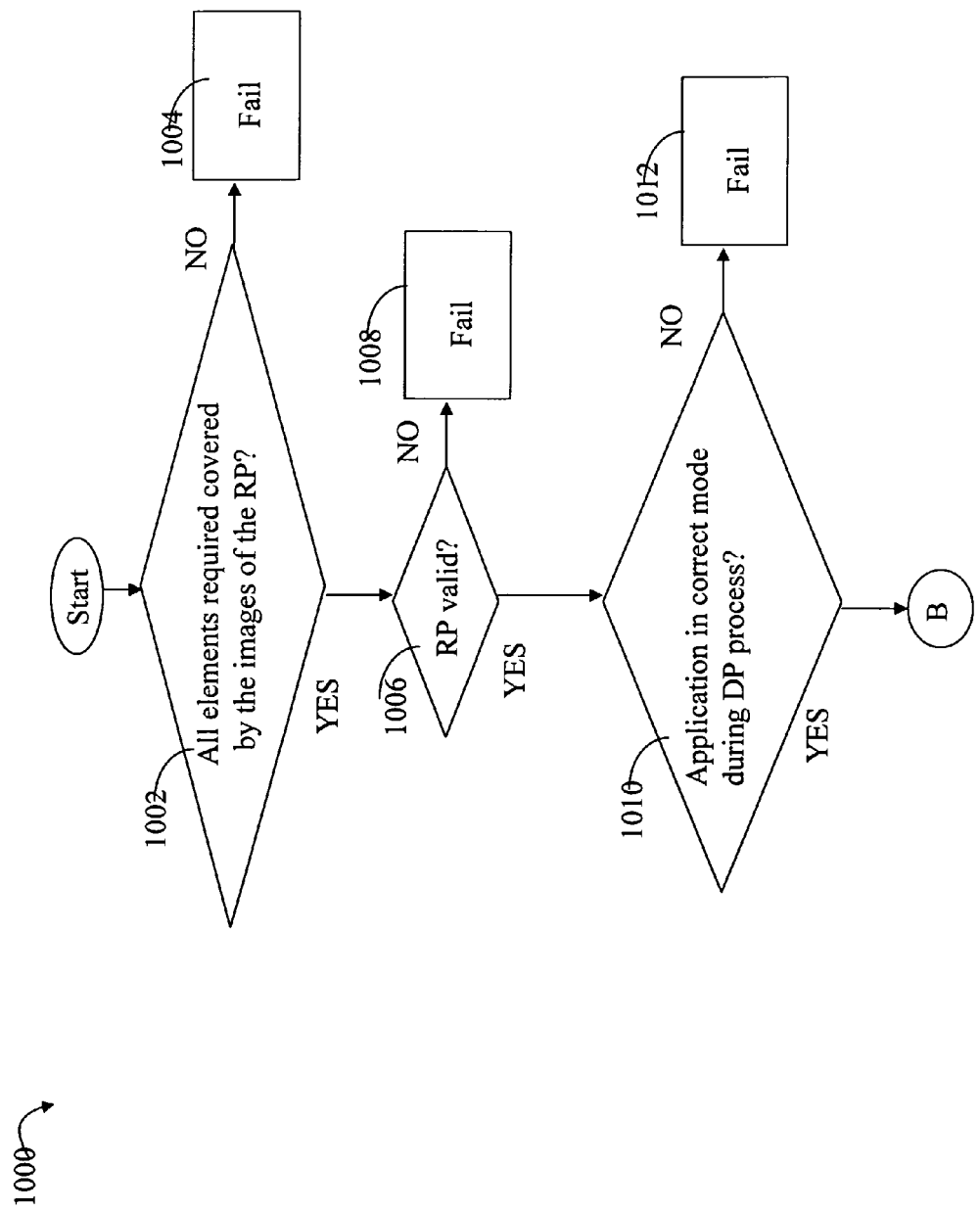
Figure 13:
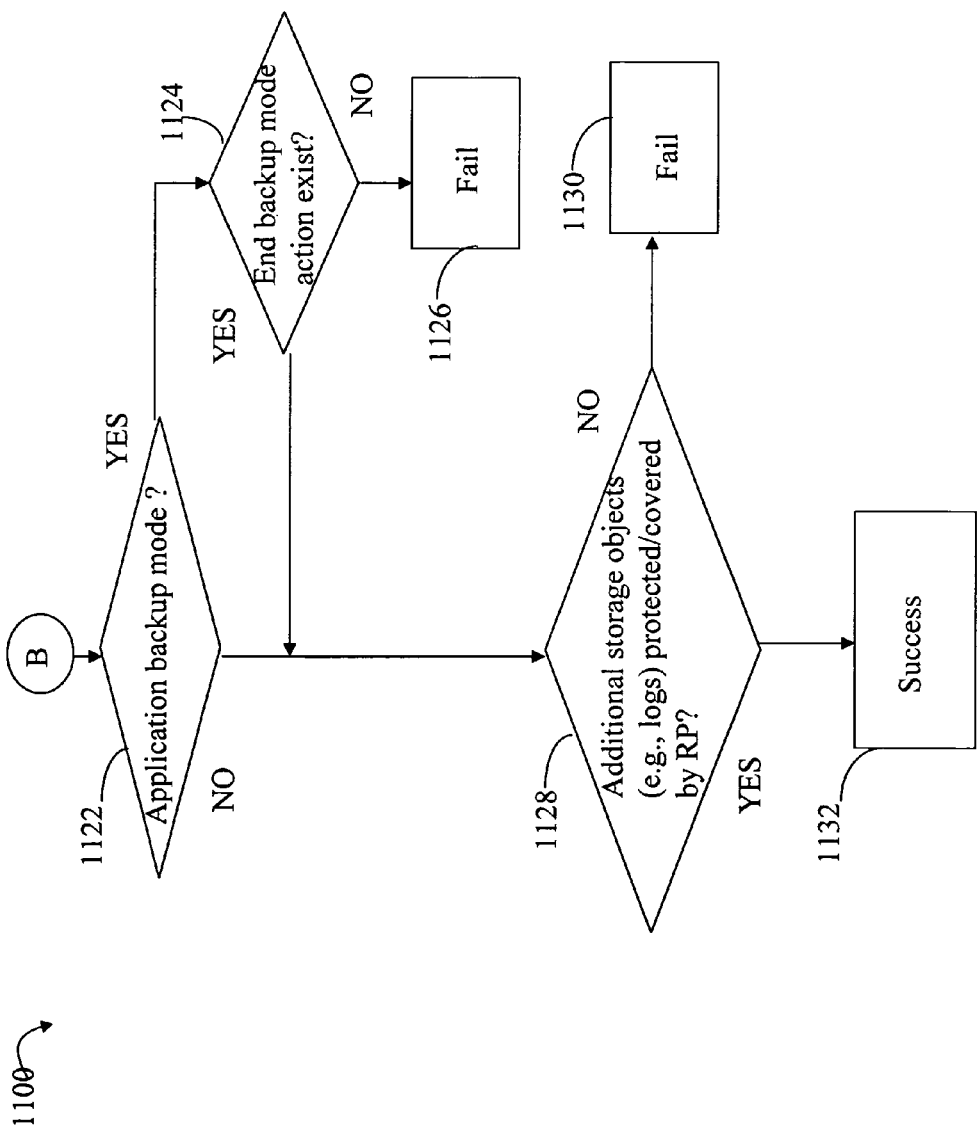

Referring to FIG. 12, shown is a flowchart for performing recoverable determination processing. The flowchart 1000 includes more detailed processing steps that may be performed in connection with step 810 of FIG. 10.

In following description, reference is made to begin and end backup mode actions which place an application accessing a data set, respectively, in and out of a special backup mode or processing state. In order to have a recoverable RP, an application may be required to be in a special mode or state when performing DP processing where an original copy of the application's data set at a source location is copied to a target location on one or more DP devices. For such an application, the begin backup mode action corresponds to the command or other action performed to place the application in this special mode prior to performing DP processing on the application's data set. Similarly, the end backup mode action corresponds to the command or other action performed to take the application out of this special mode and return the application to a normal processing state. In connection with recoverable determination processing described below, an embodiment may make a determination as to whether the appropriate steps were successfully taken in connection with the begin and end backup mode actions by examining information, for example, from a database, event log, and the like, where a record may be kept as to what actions are taken in connection with performing DP processing. Also using the database, event log, and the like, a determination can be made as to whether, once the application was placed in the special backup mode, an end backup mode action was successfully performed.

It should be noted that the application may not be required to be in a special mode when DP processing is performed. However, in order for an RP to be recoverable, the application may be required to be in a special mode while performing DP processing creating that RP. As such, processing described below may be used in connection with determining whether the RP is recoverable depending on whether the application was in the proper mode as required for creating a recoverable RP. As described herein, the application may be characterized as being in one of the following states or modes: a special backup mode, normal processing mode (such as when in use for its intended purpose and operation), or down or offline mode (such as when the application is not in use). Besides the application being in one of the foregoing states or modes, reference may also be made herein that the application, or storage object corresponding to the data set used by the application, is in one of the foregoing states or modes.

When an application is placed in the special backup mode with a begin backup mode action at a first point in time, DP processing may be performed to copy the files on the source device needed to recover an original application data set at this first point in time to the target location on the DP device. However, while the application is in the special backup mode, the application may still process user requests which modify the original application data set. Modifications made to the application data set while the application is in the special backup mode (e.g., from begin backup mode action to end backup mode action) may be recorded in a write transaction or log file. One or more log files which record the modifications made to the original application data set while the application is in the special backup mode may also be stored on a DP device as additional storage objects. In order to recover the application data set to the time period indicated by the end backup mode action, the one or more log files recording modifications made while the application was in the special backup mode are needed in addition to the files used to recover the application data at the first point in time. In connection with the recoverable rules and processing described in following paragraphs, the additional log files recording any modification from the time period of the begin backup action mode to the end backup mode action are also needed to obtain the recoverable RP and should be included in (e.g., protected by) the recoverable RP. The foregoing additional log files and the fact that they should exist for the time period between the begin and end backup mode actions is specified in connection with recoverable rule 4 and related processing steps described below. Thus, the required set of log files used to obtain a recoverable RP may include log files starting at some point prior to the begin backup mode action up until the end backup mode action. Additional log files subsequent to the end backup mode action time may be optional used to further roll the recoverable RP forward in time. It should be noted that if the application is down or offline when the DP process is performed, all files needed to recreate the application data set will be copied by the DP process and no further modifications can be made to the application data set while the DP process is being performed since the application is offline.

As described herein, a determination of failure for recoverable means that the RP is not, recoverable.

The rules used in connection with performing recoverable determination processing may indicate how to determine the following:

recoverable rule 1: whether the storage object, or entity using the data thereof, should be in a backup mode during the DP process creating the RP.

recoverable rule 2: whether an RP has all required data (e.g., whether all required data is protected by the RP).

recoverable rule 3: if the storage object as indicated by rule 1 is to be in a backup mode, then:
   a. During DP processing, was the storage object in a state of down or offline? If so, then stop current rule 3.
   b. During DP processing, was the storage object in backup mode? If so then ensure that an end backup mode action exists.

recoverable rule 4: whether the extra storage objects exist from begin backup mode to end backup mode action.

In connection with the above recoverable rules, a backup mode action of "begin" and "end" may represent, respectively, commands or actions to put the application or its components (e.g., such as the application data set comprising the RP) in a special mode during the DP process and to then transition the application from the special mode to a normal processing mode after DP processing is complete. The special mode represents a special application state that the application may be in when performing DP processing. In connection with a recoverable RP as will be described below, processing may be performed to ensure that storage objects, such as incremental log files, created as a result of the DP process during the begin time associated with the begin backup mode action and the end time associated with the end backup mode action are protected in the RP.

It should be noted that each of the above recoverable rules may actually be implemented using more than one rule although reference may be made herein to an embodiment in which each of the above recoverable rules corresponds to a single rule. In one embodiment, the rules may indicate when each of the above conditions evaluates to true.

Referring to FIG. 12, step 1002 performs a determination as to whether all data elements are included in the RP or otherwise protected by the RP. If step 1004 evaluates to no, control proceeds to step 1004 where it is determined that recoverable determination processing has failed. As described herein, a determination of success for recoverable processing means that the RP is recoverable, and a determination of failure means otherwise. If step 1004 evaluates to yes, control proceeds to step 1006 where a determination is made as to whether the RP is valid. If step 1006 evaluates to no, control proceeds to step 1008 where it is determined that recoverable determination processing has failed. If step 1008 evaluates to yes, control proceeds to step 1010 where a determination is made as to whether the application or storage object was in a proper mode or state during DP processing when the RP was created. If step 1010 evaluates to no, control proceeds to step 1012 where it is determined that recoverable determination processing has failed. Otherwise, if step 1010 evaluates to yes, control proceeds to step 1122 where it is determined whether the application or storage object should have been in backup mode at the time the DP processing was performed. If step 1122 evaluates to no, control proceeds to step 1128. If step 1122 evaluates to yes, control proceeds to step 1124 where a determination is made as to whether a backup mode action exists. If step 1124 evaluates to no, control proceeds to step 1126 where a determination is made that recoverable determination processing has failed. Otherwise, if step 1124 evaluates to yes, control proceeds to step 1128. At step 1128, a determination is made as to whether the additional storage objects created during the begin backup mode and end backup mode actions are protected by the RP. If step 1128 evaluates to no, control proceeds to step 1130 where a determination is made that the recoverable determination processing has failed. Otherwise, if step 1128 evaluates to yes, control proceeds to step 1132 where a determination is made that recoverable determination processing has succeeded.

It should be noted that steps 1002 and 1006, are similar, respectively, to steps 902 and 906 as described in connection with FIG. 11 although different files or other data elements may be used in connection with each type of RP processing. Step 1010 may use the recoverable rule 1 and the input indicating the state of the storage object, or entity that uses the data thereof, at the time the DP process was performed that created the RP. Step 1122 may also use the input indicating the state of the storage object, or entity that uses the data thereof, at the time the DP process was performed that created the RP. Step 1124 may use recoverable rule 3 and session logs or other entities recording the DP process. Step 1128 may use the list of additional storage objects, recoverable rule 4, and the timestamps corresponding to the actions, such as commands, that transitioned the storage object (or entity such as an application accessing the storage object data) in and out of backup mode.

Figure 14:
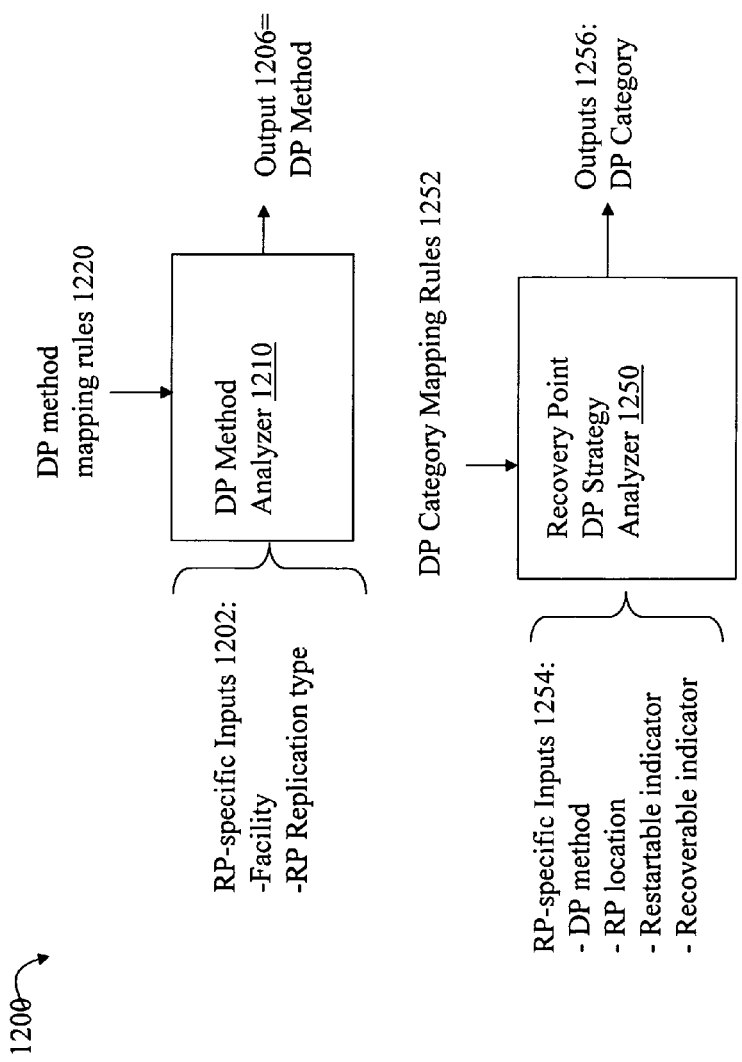

Referring to FIG. 14, shown is an example illustrating inputs and outputs as may be used by the DP method analyzer and recovery point DP strategy analyzer in an embodiment. In the example 1200, the DP method analyzer 1210 may use as inputs the DP method mapping rules 1220 and RP-specific inputs 1202. The inputs 1202 may include the facility and RP replication type associated with RP being analyzed. The input 1220 may be the rules, or a portion thereof, as illustrated in FIG. 5. Analyzer 1210 determines the DP method as output 1206. The recovery point DP strategy analyzer 1250 may use as inputs the DP category mapping rules 1252 and RP-specific inputs 1254. The inputs 1254 may include the DP method (as determined by 1210), the RP location, a restartable indicator, and a recoverable indicator. The restartable and recoverable indicators may indicate, respectively, whether an RP is restartable and recoverable. The foregoing indicators may be generated as outputs of the RPAA 720 as described above. The input 1252 may be the rules, or a portion thereof, as illustrated in FIG. 6. Analyzer 1250 determines the DP category as output 1256. As described elsewhere herein, for an RP mapped to a selected DP category, the attributes of the RP represent the data protection strategy for providing data protection for the incidents or events of the selected DP category. Such attributes associated with the RP may include, for example, the DP method used to create the RP, RPO, RP location, and other information as may be included in a row of the table of FIG. 2 for an implemented DPP.

Figure 15:
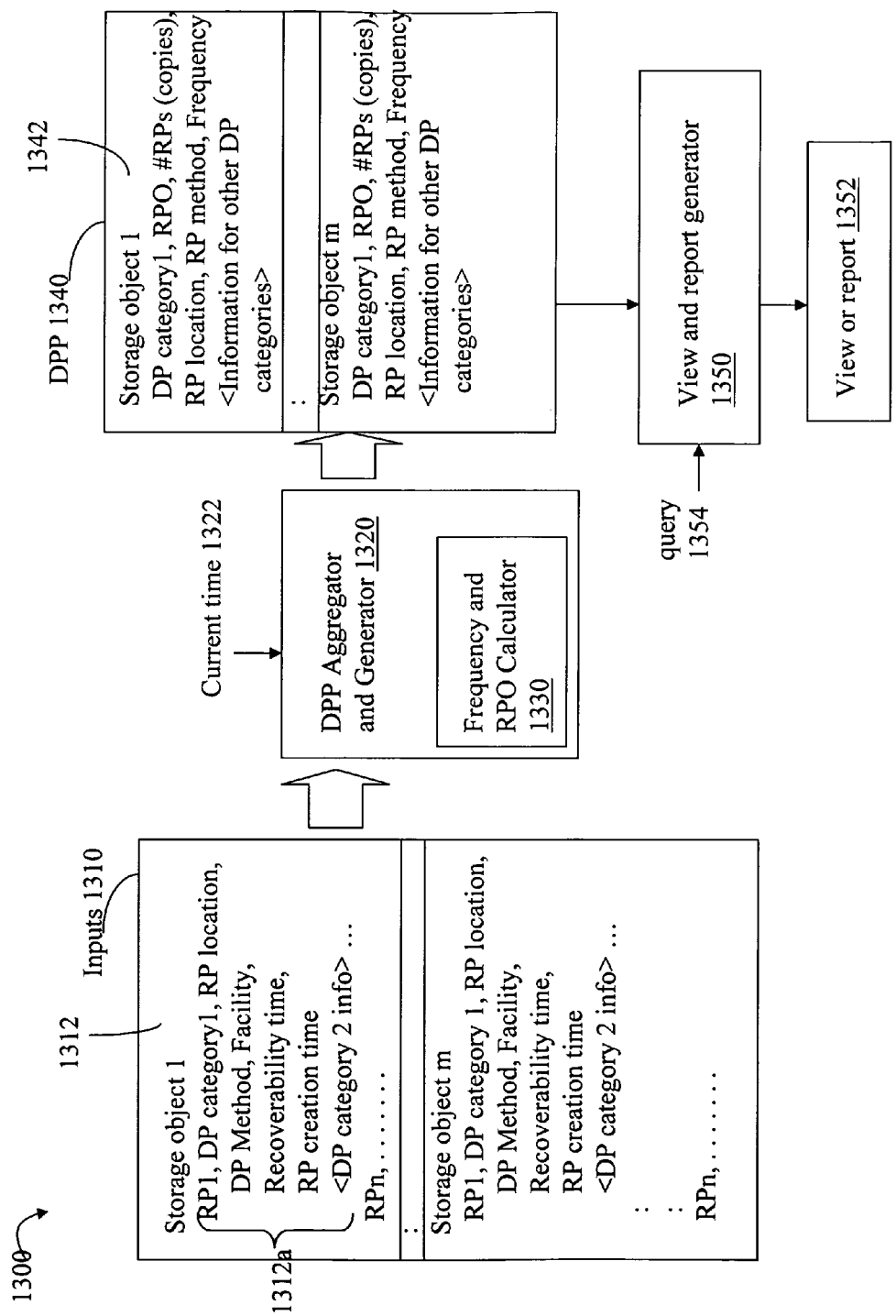

Referring to FIG. 15, shown is an example illustrating inputs and outputs as may be used by the DPP aggregator and generator 1320 and view and report generator 1350 as may be included in an embodiment performing the techniques herein. The DPP aggregator and generator 1320 may takes as inputs the current time 1322, and inputs 1310 and generate as an output the DPP 1340. The module 1320 may include a frequency and RPO calculator which calculates the frequency and RPO for each DP category associated with a storage object. The inputs 1310 may collectively represent information for each storage object, and each RP for a given storage object. Although the inputs 1310 are illustrated as having a particular structure, it should be noted that module 1320 may receive the information 1310 in any form, format or structure suitable for use by 1320. The module 1320 may actually perform processing to organize the information of 1310 rather than receive 1310 in a structured form as illustrated. The information in 1310 may include a record 1312 for each storage object. The record 1312 may include a portion 1312$a$ for each RP of the storage object. The information in 1312$a$ may include, for example, the DP category as determined by module 1250 of FIG. 14, the DP method as determined by module 1210 of FIG. 14, various RP attributes such as the RP location and facility as described in connection with FIGS. 5 and 6, a recoverability time, and RP creation time. The recoverability time may represent an initial point in time and a subsequent span of time for which the RP provides recoverability of data for the associated storage object. The recoverability time associated with each RP may be used in determining the actual RPO for a particular DP category of an implemented DPP. The RPO for a DP category of a storage object in which one or more RPs are mapped to the DP category may be expressed as:

RPO(storage object,DP category, set of RPs)=current time−(MAX(recoverability time for all RPs in the set of RPs)

where MAX determines the latest or most recent date/time.

The RP creation time may represent the time at which the RP was created or time at which the DP process causing generation of the RP was initiated. An embodiment may determine frequency in a variety of different ways. An embodiment may determine the frequency based on a DP schedule or plan specifying when a DP process is performed for a given storage object. Rather than determine the frequency based on planned times, the frequency may be determined as an actual frequency using date/time information associated with when each RP was actually created, or in other words, when the DP process resulting in creation of the RP occurred. Such data/time information may be obtained using attribute information associated with each RP, for example, as may be derived using session logs recorded when the scheduled DP processing actually occurred. In this latter case, an embodiment may use information such as the RP creation time to determine the frequency at which an RP is created for a given time period. The actual frequency may be calculated using information obtained in a variety of different ways and may be determined, for example, by counting a number of RPs created during a time period or time interval.

The DPP 1340 represents information than may be collected, calculated and associated with each storage object for a DPP 1340. The DPP 1340 may be stored, for example, in a DPP table as described elsewhere herein The DPP 1340 may include a record 1342 of DPP information for each storage object. The information in 1340 may be used to generate views and reports in response to user queries. Thus, the DPP 1340 may be used as input to the view and report generator 1350 to generate the desired view or report 1354 in accordance with a user query 1354. input to the generator 1350.

In connection with the various modules illustrated herein as comprising the DPP builder, each module may use different inputs and/or generate other outputs than as described for purposes of example illustrating the techniques herein. For example, the input 1310 and DPP 1340 may also include other information than as illustrated in FIG. 15.

Figure 16:
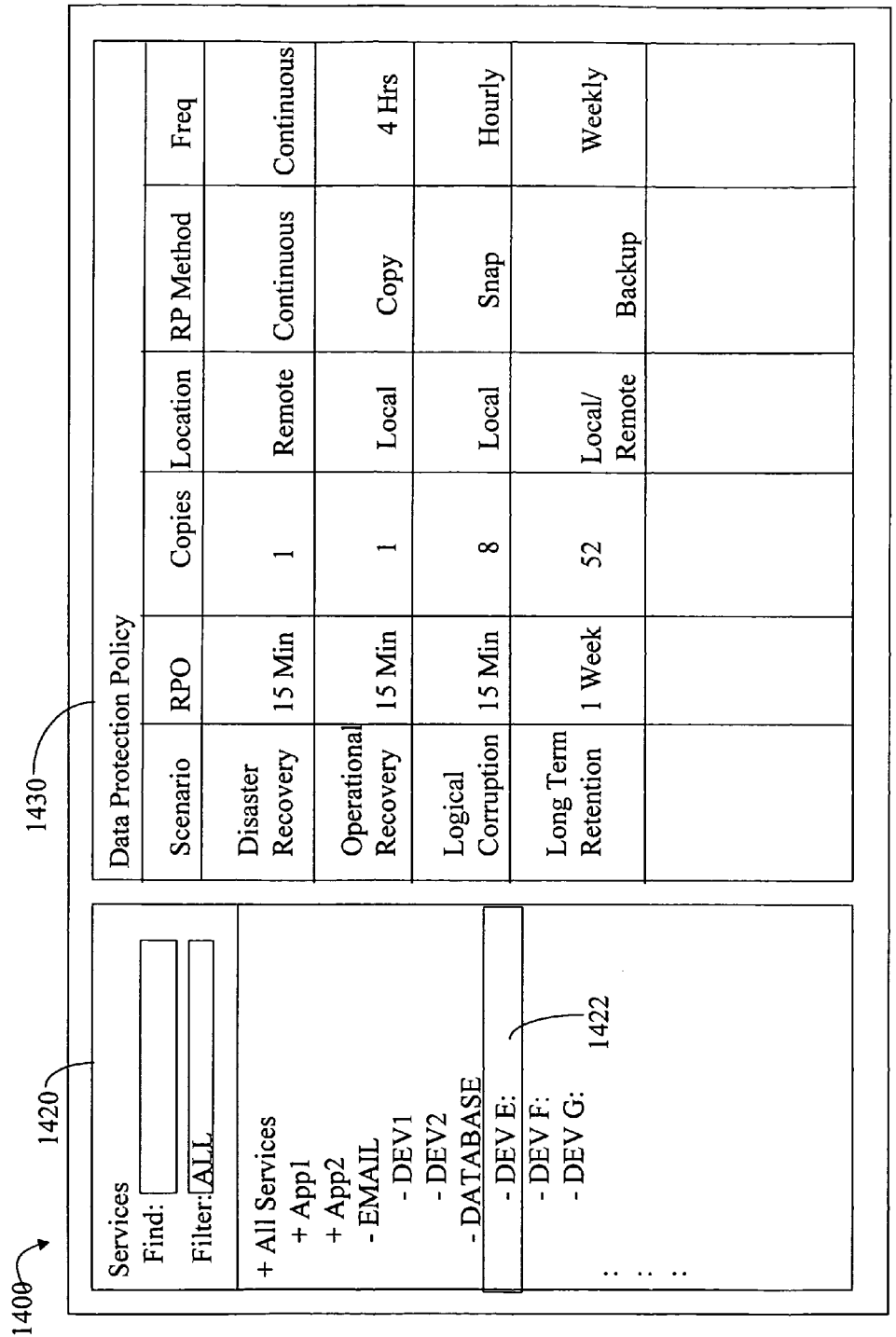
FIG. 16 is an example illustrating information that may be displayed in connection with a user interface in an embodiment using the techniques herein.

Referring to FIG. 16, shown is an example of information than may be included in a user interface display for use in performing the techniques herein in an embodiment. The example 1400 includes a left side 1420 that may be used to make selections. The portion 1420 may list one or more services, such as may be provided by different applications. For each such application, one or more devices including data used by the application may also be optionally displayed. In the example 1420, services may be provided by App1, App2, EMAIL (an email application), and DATABASE (a database application). A selection has been made to expand the information included in 1420 for the EMAIL and DATABASE applications so that the different devices used by each are also included in the display. A user has then made a selection 1422 requesting to display DPP information for DEV E: as used by the DATABASE application. The foregoing selection illustrated by 1422 may correspond to submission of a user query as described above, for example, in connection with steps 256 and 258 of FIG. 4. In response, to the selection 1422, processing may be performed to generate the view as illustrated by 1430. In this example and as also described herein, the DPP information of 1430 does not include an RTO value but a DPP can include RPOs, RTOs and/or other information than as illustrated.

The view provided and illustrated in 1400 may be characterized as a policy-centric view of an implemented or configured DPP.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining an implemented data protection policy comprising:

determining one or more storage objects for which data protection processing is performed, said data protection processing including copying data for each of said one or more storage objects to one or more data protection storage devices;

determining one or more recovery points corresponding to each of said one or more storage objects;

selecting a data protection method for each of said one or more recovery points, wherein said data protection method selected is associated with said each recovery point and is determined in accordance with a facility and replication type associated with said each recovery point;

selecting a data protection category for each of said one or more recovery points, wherein said data protection category selected is associated with said each recovery point and is determined in accordance with said data protection method, a recovery point type, and a recovery point location associated with said each recovery point; and storing a data protection policy indicating an implemented data protection policy for each of said one or more storage objects for at least one data protection category, said data protection policy for said each storage object for a first data protection category including a first data protection method and a first recovery point location associated with at least one of said one or more recovery points corresponding to said each storage object, wherein said first data protection category is determined by said selecting a data protection category and said first data protection method is determined by said selecting a data protection method.

2. The method of claim 1, wherein said data protection policy for said each storage object for said first data protection category includes an actual recovery point objective indicating an amount of data lost upon the occurrence of an incident in said first data protection category that causes data failure where the amount of data lost is measured in time.

3. The method of claim 1, wherein said data protection policy for said each storage object for said first data protection category includes an actual frequency indicating a rate at which a data protection process is performed for said first data protection category.

4. The method of claim 1, wherein, for a first of said recovery points that corresponds to a first of said storage objects and is associated with a data protection category, the first recovery point is created as a result of implementation of a data protection strategy for providing data protection for said first storage object upon an occurrence of an event included in said data protection category that causes a data failure.

5. The method of claim 1, wherein said recovery point type is one of recoverable or restartable.

6. The method of claim 5, wherein a restartable recovery point is a recovery point for which after a set of images comprising said recovery point is restored, no additional processing is needed prior to using data of said recovery point that has been restored.

7. The method of claim 6, wherein said restartable recovery point is a recovery point that cannot be rolled forward in time to reflect a state of the data of the recovery point at a later time.

8. The method of claim 5, wherein a recoverable recovery point is a recovery point for which, after a set of images comprising said recovery point is restored, additional processing is performed in order to use data of said recovery point that has been restored.

9. The method of claim 8, wherein said recoverable recovery point is a recovery point that is optionally rolled forward in time to reflect a state of data of the recovery point at a later time.

10. The method of claim 9, wherein said additional processing reconstructs a working data set use by an application.

11. The method of claim 1, wherein at least one of said storage objects is a file system, data used by an application, a file, a directory, a physical device, a logical device, or a portion of a device.

12. The method of claim 1, further comprising:
receiving a query for a data protection policy for a selected one of said storage objects; and
generating a view of said data protection policy.

13. The method of claim 1, wherein said selecting a data protection method uses a first set of mapping rules and said selecting a data protection category use a second set of mapping rules.

14. A computer readable medium comprising executable code stored thereon for determining an implemented data protection policy, the computer readable medium comprising executable code for:
determining one or more storage objects for which data protection processing is performed, said data protection processing including copying data for each of said one or more storage objects to one or more data protection storage devices;
determining one or more recovery points corresponding to each of said one or more storage objects;
selecting a data protection method for each of said one or more recovery points, wherein said data protection method selected is associated with said each recovery point and is determined in accordance with a facility and replication type associated with said each recovery point;
selecting a data protection category for each of said one or more recovery points, wherein said data protection category selected is associated with said each recovery point and is determined in accordance with said data protection method, a recovery point type, and a recovery point location associated with said each recovery point; and
storing a data protection policy indicating an implemented data protection policy for each of said one or more storage objects for at least one data protection category, said data protection policy for said each storage object for a first data protection category including a first data protection method and a first recovery point location associated with at least one of said one or more recovery points corresponding to said each storage object, wherein said first data protection category is determined by said selecting a data protection category and said first data protection method is determined by said selecting a data protection method.

15. The computer readable medium of claim 14, wherein said data protection policy for said each storage object for said first data protection category includes an actual recovery point objective indicating an amount of data lost upon the occurrence of an incident in said first data protection category that causes data failure where the amount of data lost is measured in time, and an actual frequency indicating a rate at which a data protection process is performed for said first data protection category.

* * * * *